(12) United States Patent
Sugiyama et al.

(10) Patent No.: US 8,706,838 B2
(45) Date of Patent: Apr. 22, 2014

(54) TESTING APPARATUS, TESTING METHOD AND COMPUTER-READABLE STORAGE MEDIUM

(75) Inventors: Taichi Sugiyama, Kawasaki (JP); Takeshi Yasuie, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 352 days.

(21) Appl. No.: 13/276,513

(22) Filed: Oct. 19, 2011

(65) Prior Publication Data

US 2012/0158895 A1 Jun. 21, 2012

(30) Foreign Application Priority Data

Dec. 17, 2010 (JP) ................ 2010-282426

(51) Int. Cl.
*G06F 15/16* (2006.01)
(52) U.S. Cl.
USPC .......... 709/217; 709/203; 709/220; 709/224; 370/328
(58) Field of Classification Search
USPC .......... 709/217, 203, 220, 224; 370/328, 449
See application file for complete search history.

(56) References Cited

U.S. PATENT DOCUMENTS

| | | | |
|---|---|---|---|
| 5,761,486 A | 6/1998 | Watanabe et al. | |
| 7,120,125 B2 | 10/2006 | Kikuchi et al. | |
| 8,543,681 B2* | 9/2013 | Bearden et al. | 709/224 |
| 2003/0097438 A1* | 5/2003 | Bearden et al. | 709/224 |
| 2008/0259937 A1* | 10/2008 | Hagenauer et al. | 370/400 |
| 2008/0285467 A1* | 11/2008 | Olgaard | 370/242 |

FOREIGN PATENT DOCUMENTS

| | | |
|---|---|---|
| JP | 09-062601 A | 3/1997 |
| JP | 2003-008648 A | 1/2003 |
| JP | 2006-295516 A | 10/2006 |

* cited by examiner

*Primary Examiner* — Khanh Dinh
(74) *Attorney, Agent, or Firm* — Fujitsu Patent Center

(57) ABSTRACT

A testing apparatus includes a storage to store a communication log including a communication time and a response confirmation number of packets, and a processing circuit to generate an additional packet having a communication time and a response confirmation number between two consecutive packets having an interval greater than or equal to a threshold value in the communication log. The interval may be an interval of the communication times of or, an interval of the response confirmation numbers of the two consecutive packets. The testing apparatus also includes an interface unit to send the packets stored in the storage and the additional packet to a destination at a time interval based on communication times thereof.

9 Claims, 27 Drawing Sheets

FIG.18

| SESSION ID | TIME | SOURCE IP ADDRESS | DESTINATION IP ADDRESS | SOURCE PORT NUMBER | DESTINATION PORT NUMBER | SEQUENCE NUMBER | ACK NUMBER | SYN | ACK | PSH | FIN | HTTP INFORMATION | PAYLOAD |
|---|---|---|---|---|---|---|---|---|---|---|---|---|---|
| abc | 0.0 | 10.10.10.10 | 20.20.20.20 | 2000 | 80 | 1000 | - | 1 | - | - | - | - | |
| abc | 0.3 | 20.20.20.20 | 10.10.10.10 | 80 | 2000 | 2000 | 1001 | 1 | 1 | - | - | - | |
| abc | 0.4 | 10.10.10.10 | 20.20.20.20 | 2000 | 80 | 1001 | 2001 | - | 1 | - | - | - | |
| abc | 2.1 | 10.10.10.10 | 20.20.20.20 | 2000 | 80 | 1001 | 2001 | - | 1 | 1 | - | GET | |
| abc | 2.3 | 20.20.20.20 | 10.10.10.10 | 80 | 2000 | 2001 | 3001 | - | 1 | - | - | - | |
| abc | 2.4 | 20.20.20.20 | 10.10.10.10 | 80 | 2000 | 2001 | 3001 | - | 1 | - | - | - | |
| abc | 2.6 | 10.10.10.10 | 20.20.20.20 | 2000 | 80 | 3001 | 3001 | - | 1 | - | - | - | |
| ... | ... | ... | ... | ... | ... | ... | ... | ... | ... | ... | ... | ... | ... |
| abc | 3.4 | 10.10.10.10 | 20.20.20.20 | 2000 | 80 | 3001 | 12000 | - | 1 | - | - | - | |
| abc | 3.6 | 20.20.20.20 | 10.10.10.10 | 80 | 2000 | 12000 | 3001 | - | 1 | - | - | - | |
| ... | ... | ... | ... | ... | ... | ... | ... | ... | ... | ... | ... | ... | ... |
| abc | 4.9 | 20.20.20.20 | 10.10.10.10 | 80 | 2000 | 31000 | 3001 | - | 1 | - | - | - | |
| abc | 5.4 | 10.10.10.10 | 20.20.20.20 | 2000 | 80 | 3001 | 31000 | - | 1 | - | - | - | |
| ... | ... | ... | ... | ... | ... | ... | ... | ... | ... | ... | ... | ... | ... |
| abc | 7.6 | 20.20.20.20 | 10.10.10.10 | 80 | 2000 | 82000 | 3001 | - | 1 | - | - | - | |
| abc | 7.7 | 20.20.20.20 | 10.10.10.10 | 80 | 2000 | 83000 | 3001 | - | 1 | 1 | 1 | 200 OK | |
| ... | ... | ... | ... | ... | ... | ... | ... | ... | ... | ... | ... | ... | ... |
| def | 8.0 | 10.10.10.10 | 20.20.20.20 | 8000 | 21 | 20000 | - | 1 | - | - | - | - | |
| def | 8.5 | 20.20.20.20 | 10.10.10.10 | 21 | 8000 | 3000 | 20001 | 1 | 1 | - | - | - | |
| def | 8.6 | 10.10.10.10 | 20.20.20.20 | 8000 | 21 | 20001 | 3001 | - | 1 | - | - | - | |
| ... | ... | ... | ... | ... | ... | ... | ... | ... | ... | ... | ... | ... | ... |

| SESSION ID | TIME | SOURCE IP ADDRESS | DESTINATION IP ADDRESS | SOURCE PORT NUMBER | DESTINATION PORT NUMBER | SEQUENCE NUMBER | ACK NUMBER | ... | PAYLOAD | ADDITIONAL PACKET FLAG |
|---|---|---|---|---|---|---|---|---|---|---|
| abc | 0.0 | 10.10.10.10 | 20.20.20.20 | 2000 | 80 | 1000 | - | ... | | |
| abc | 0.4 | 10.10.10.10 | 20.20.20.20 | 2000 | 80 | 1001 | 2001 | ... | | |
| abc | 2.1 | 10.10.10.10 | 20.20.20.20 | 2000 | 80 | 1001 | 2001 | ... | | |
| abc | 2.6 | 10.10.10.10 | 20.20.20.20 | 2000 | 80 | 3001 | 3001 | ... | | |
| ... | ... | ... | ... | ... | ... | ... | ... | ... | ... | ... |
| abc | 3.4 | 10.10.10.10 | 20.20.20.20 | 2000 | 80 | 3001 | 12000 | ... | | |
| abc | 3.8 | 10.10.10.10 | 20.20.20.20 | 2000 | 80 | 3001 | 14000 | ... | | 1 |
| abc | 4.2 | 10.10.10.10 | 20.20.20.20 | 2000 | 80 | 3001 | 16000 | ... | | 1 |
| abc | 5.4 | 10.10.10.10 | 20.20.20.20 | 2000 | 80 | 3001 | 31000 | ... | | ... |
| ... | ... | ... | ... | ... | ... | ... | ... | ... | ... | ... |
| def | 8.0 | 10.10.10.10 | 20.20.20.20 | 8000 | 21 | 20000 | - | ... | | |
| def | 8.6 | 10.10.10.10 | 20.20.20.20 | 8000 | 21 | 20001 | 3001 | ... | | ... |
| ... | ... | ... | ... | ... | ... | ... | ... | ... | ... | ... |

FIG.23

| SESSION ID | TIME | SOURCE IP ADDRESS | DESTINATION IP ADDRESS | SOURCE PORT NUMBER | DESTINATION PORT NUMBER | SEQUENCE NUMBER | ACK NUMBER | ... |
|---|---|---|---|---|---|---|---|---|
| abc | 2.1 | 10.10.10.10 | 20.20.20.20 | 2000 | 80 | 10001 | 5001 | ... |
| abc | 2.4 | 10.10.10.10 | 20.20.20.20 | 2000 | 80 | 14001 | 7001 | ... |
| .. | .. | .. | .. | .. | .. | .. | .. | .. |

+6000
+6000

| SESSION ID | TIME | SOURCE IP ADDRESS | DESTINATION IP ADDRESS | SOURCE PORT NUMBER | DESTINATION PORT NUMBER | SEQUENCE NUMBER | ACK NUMBER | ... |
|---|---|---|---|---|---|---|---|---|
| ijk | 2.1 | ... | ... | 9000 | 80 | 10001 | 11001 | ... |
| ijk | 2.4 | ... | ... | 9000 | 80 | 14001 | 13001 | ... |
| .. | .. | .. | .. | .. | .. | .. | .. | .. |

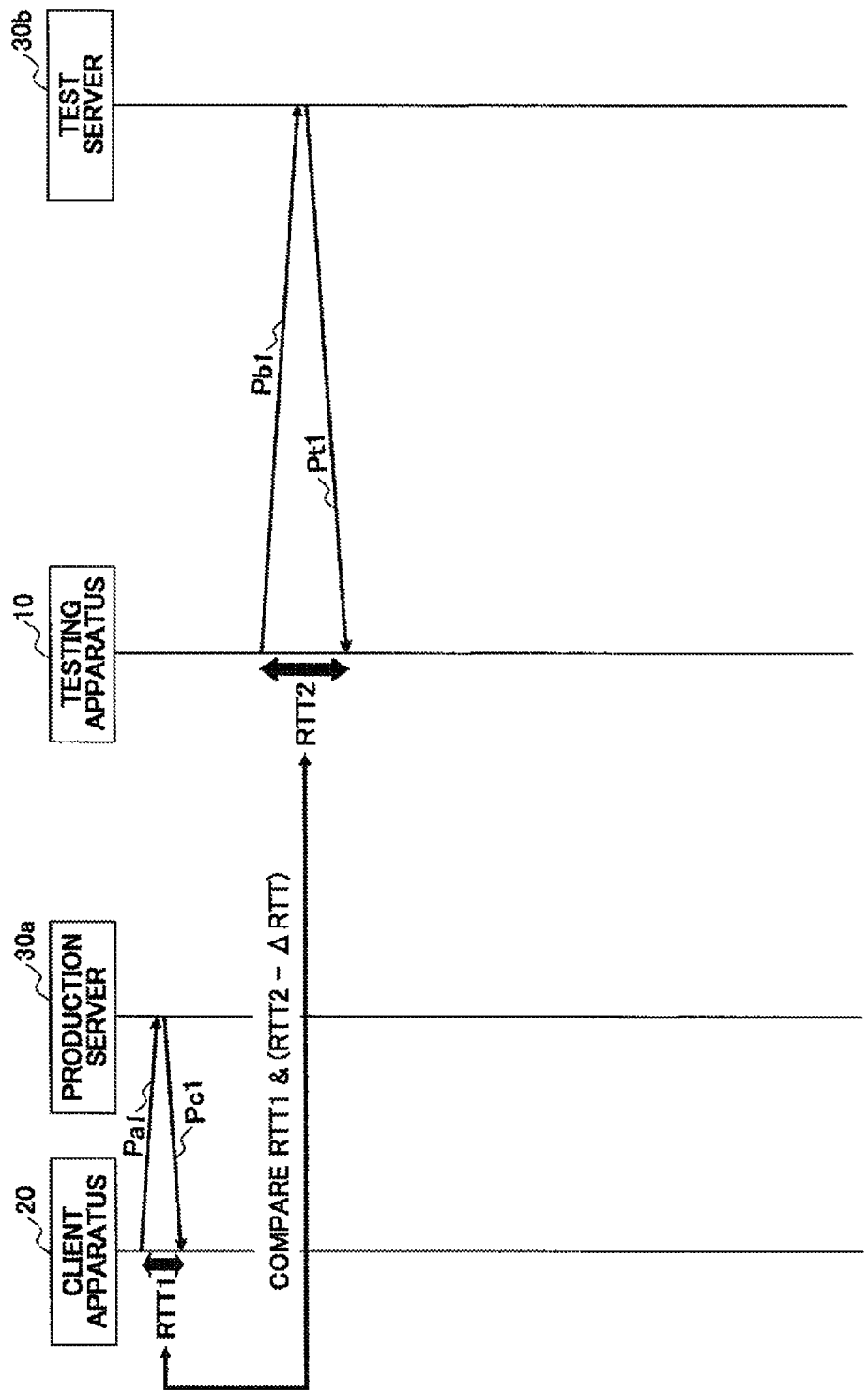

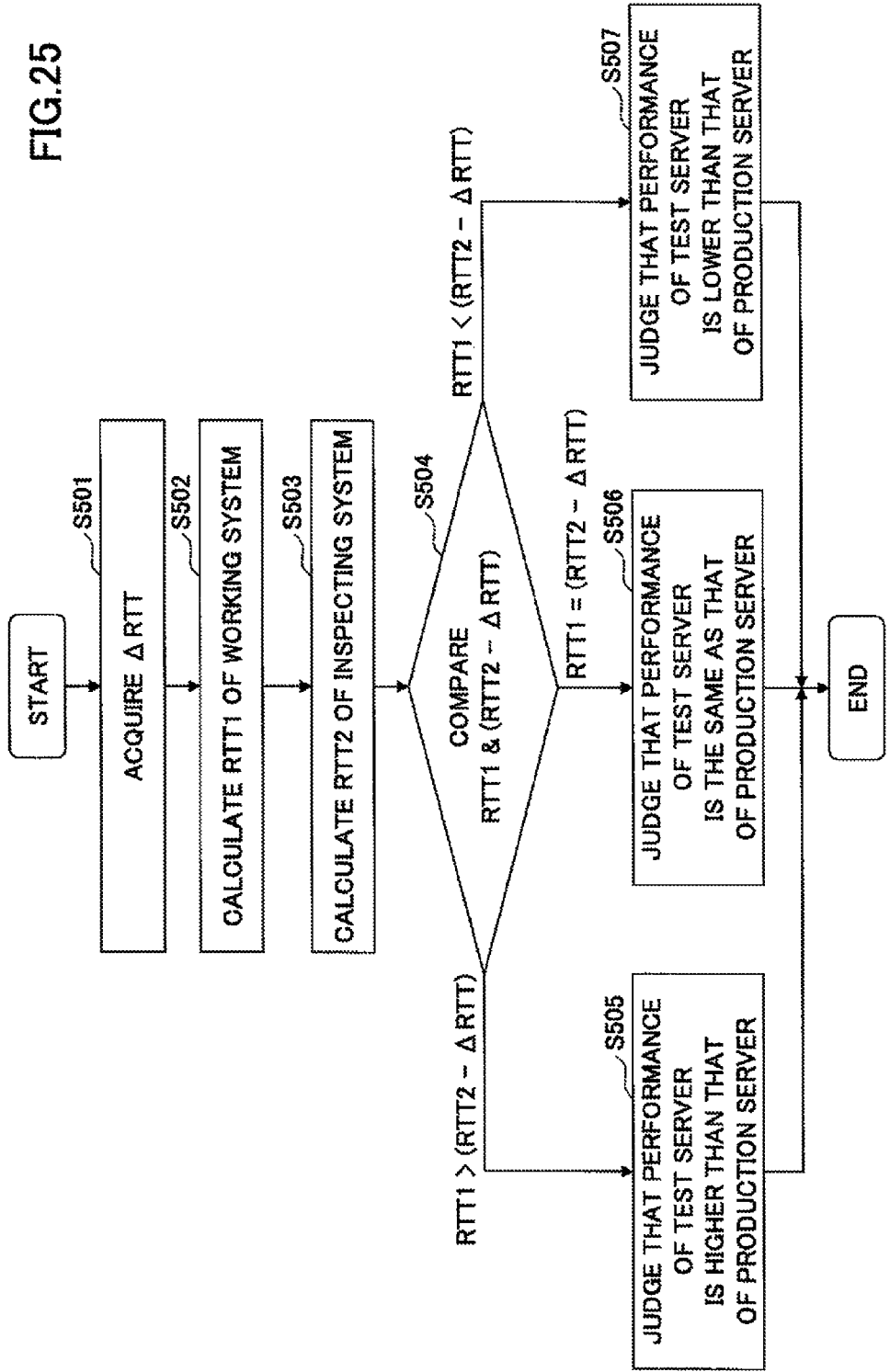

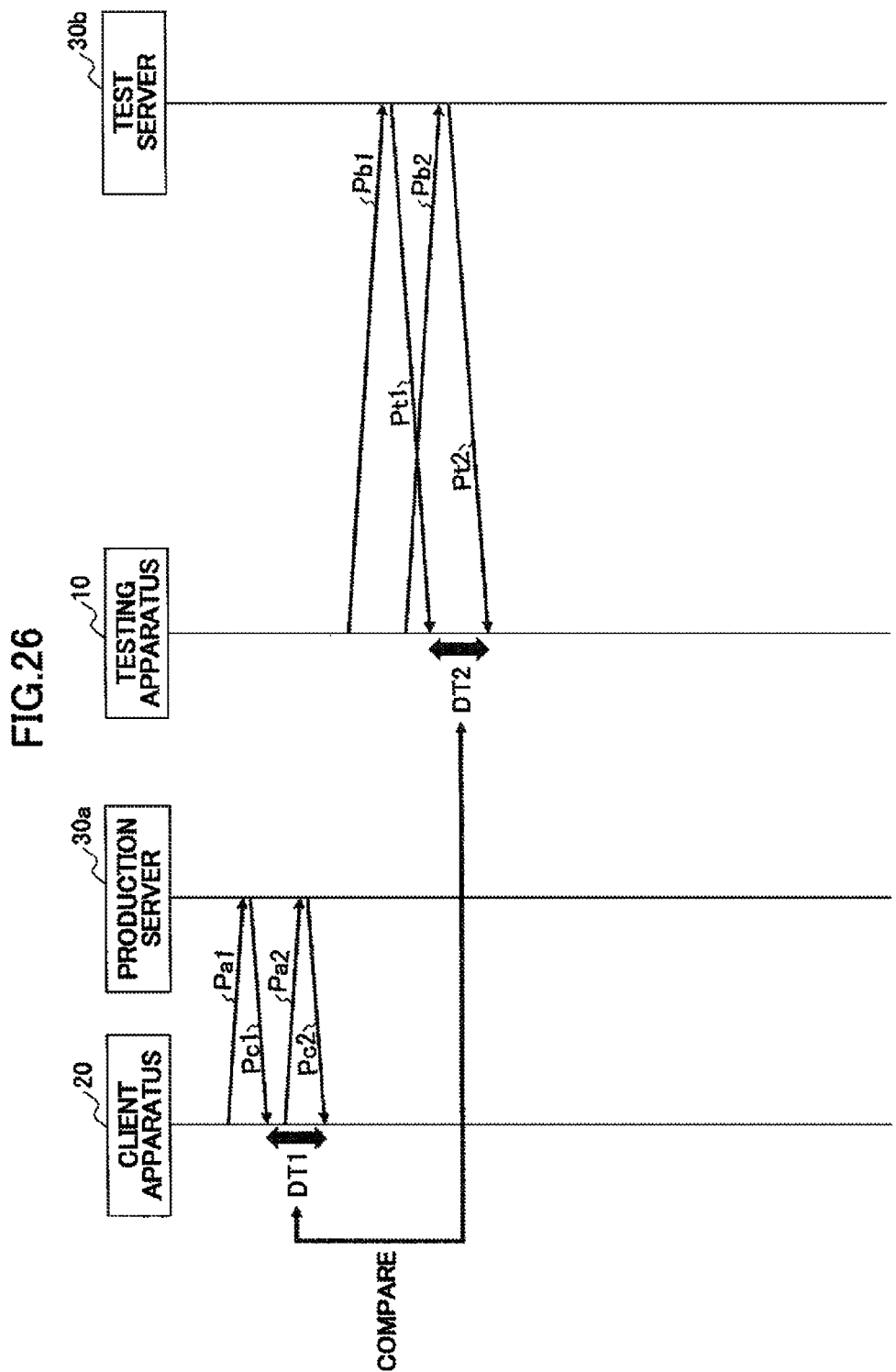

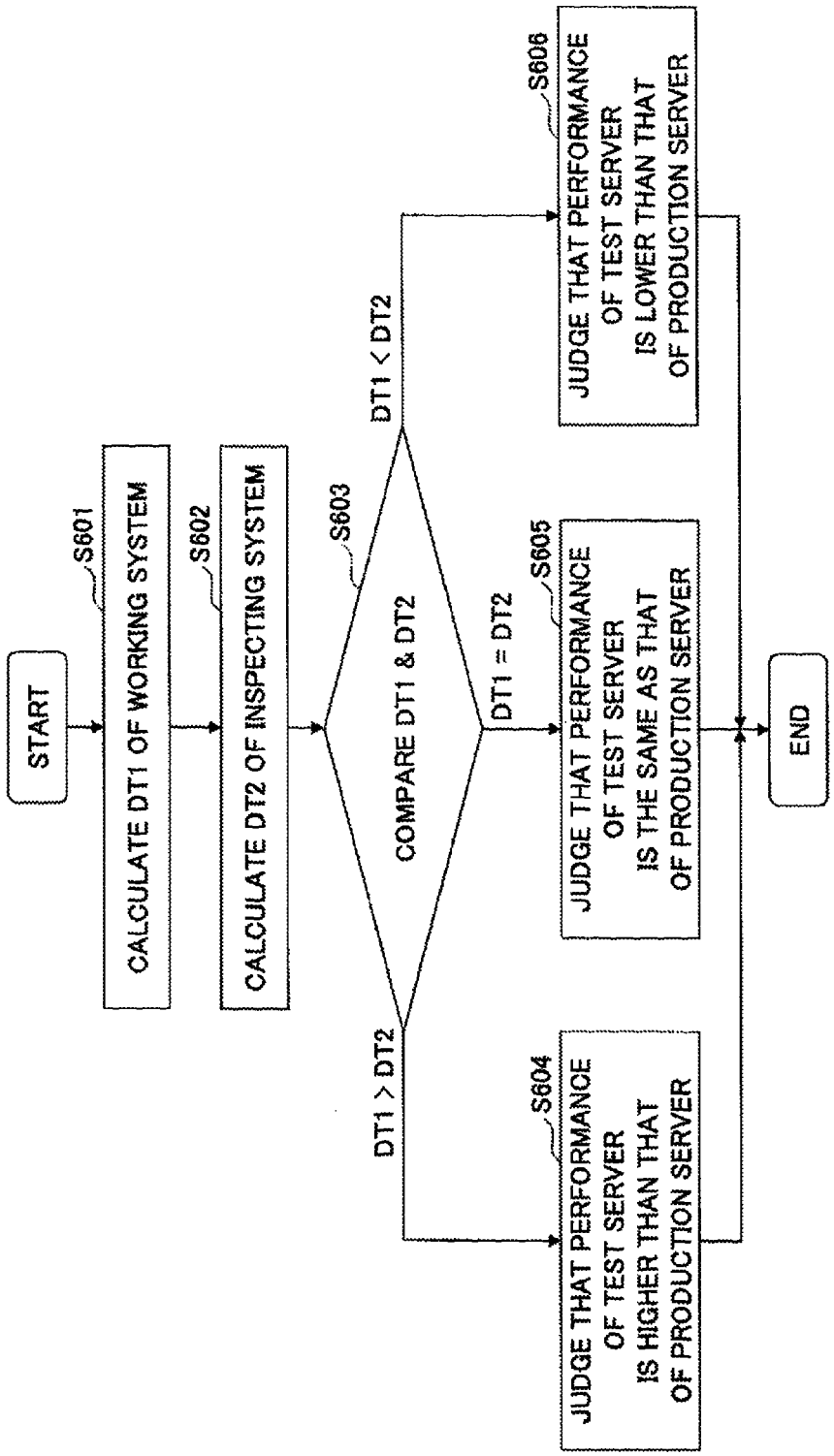

TESTING APPARATUS, TESTING METHOD AND COMPUTER-READABLE STORAGE MEDIUM

CROSS-REFERENCE TO RELATED APPLICATIONS

This application is based upon and claims the benefit of priority of the prior Japanese Patent Application No. 2010-282426, filed on Dec. 17, 2010, the entire contents of which are incorporated herein by reference.

FIELD

The embodiments discussed herein are related to a testing apparatus, a testing method, and a computer-readable storage medium that may perform a performance evaluation test on a computer.

BACKGROUND

In a related art, a technique related to performance evaluation between a client and a server has been proposed. On the other hand, when moving a system to a destination, for example, a performance evaluation test is performed to quickly and accurately inspect an test server that becomes the destination.

FIG. 1 is a diagram for explaining a first example of a performance evaluation test process related to the test server in the related art. In FIG. 1, it is assumed for the sake of convenience that an test server B is arranged at a remote location with respect to a production server A and a testing terminal C. For example, the production server A and the testing terminal C are located in Osaka, and the test server B is located in Tokyo.

The production server A is a computer that is actually working (or running). The test server B is a computer to which the production server A is expected to move. The testing terminal C captures packets related to a communication between the testing terminal C and the production server A, and sends the captured packets to the test server B with a sequence pattern identical to that of the production server A. Hence, a test may be performed on the test server B by a communication having a pattern (packet and its response packet) identical to that of the communication performed with respect to the production server A.

FIG. 2 is a diagram for explaining a second example of the performance evaluation test process related to the test server in the related art. In FIG. 2, a production server A and a testing terminal C1 are located in Osaka, and an test server B and a testing terminal C2 are located in Tokyo. The testing terminal C1 performs a packet communication between the testing terminal C1 and the production server A. The testing terminal C2 performs a packet communication between the testing terminal C2 and the test server B. When making the packet communication, the testing terminal C2 sends the packets to the test server B with a sequence pattern identical to that of the packet communication performed by the testing terminal C1. Based on the packets captured by the testing terminals C1 and C2, a relative performance evaluation of the test server B may be made with respect to the production server A.

However, according to the first example illustrated in FIG. 1, a communication distance between the production server A and the testing terminal C and a communication distance between the test server B and the testing terminal C differ. For this reason, a difference between an RTT (Round Trip Time) of the production server A and an RTT of the test server B affects process intervals of the production server A and the test server B. In other words, a packet communication interval of the test server B becomes longer than a packet communication interval of the production server A. As a result, the performance evaluation of the test server B may not be made with a load identical to that of the production server A, and a quality of the performance evaluation may deteriorate.

On the other hand, according to the second example illustrated in FIG. 2, in order to perform the test by the test server B with a load identical to that of the production server A, a person (hereinafter referred to as a "tester") conducting the test needs to bring the captured data, captured by the testing terminal C1 with respect to the communication of the production server A and indicating the packet sequence, to the location (in this example, Tokyo) where the test server B is located. The tester then causes the testing terminal C2 to send the packets based on the captured data. In this second example, the tester needs to move to the location of the test server B, and the load on the tester associated with the moving and operating the testing terminal C2 is relatively large.

SUMMARY

According to one aspect of the present invention, a testing apparatus, a testing method, and a computer-readable storage medium may perform an appropriate performance evaluation test on a computer.

According to one aspect of an embodiment, a testing apparatus may include a first storage configured to store a communication log including a communication time and a response confirmation number of a plurality of packets; a processing circuit configured to generate an additional packet having a communication time and a response confirmation number between two consecutive packets having an interval greater than or equal to a threshold value in the communication log, wherein the interval is one of an interval of the communication times of the two consecutive packets and an interval of the response confirmation numbers of the two consecutive packets; and an interface unit to send each of the plurality of packets stored in the first storage and the additional packet to a destination at a time interval based on respective communication times thereof.

According to one aspect of an embodiment, a testing method to be implemented in a computer, includes generating, by a processing circuit of the computer, an additional packet having a communication time and a response confirmation number between two consecutive packets having an interval greater than or equal to a threshold value in a communication log that is stored in a first storage and includes a communication time and a response confirmation number of a plurality of packets, wherein the interval is one of an interval of the communication times of the two consecutive packets and an interval of the response confirmation numbers of the two consecutive packets; and sending each of the plurality of packets stored in the first storage and the additional packet to a destination at a time interval based on respective communication times thereof.

According to one aspect of an embodiment, a non-transitory computer-readable storage medium that stores a program which, when executed by a computer, causes the computer to perform a process that includes generating, by a processing circuit of the computer, an additional packet having a communication time and a response confirmation number between two consecutive packets having an interval greater than or equal to a threshold value in a communication log that is stored in a first storage and includes a communication time and a response confirmation number of a plurality of packets, wherein the interval is one of an interval of the communication times of the two consecutive packets and an interval of the response confirmation numbers of the two consecutive packets; and sending each of the plurality of packets stored in the first storage and the additional packet to a destination at a time interval based on respective communication times thereof.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 is a diagram illustrating an example of a structure of a working system communication log storage;

FIG. 21 is a diagram illustrating an example of a structure of a test data storage;

FIG. 23 is a diagram for explaining a conversion of the ACK number;

FIG. 24 is a diagram for explaining a first performance evaluation method;

FIG. 25 is a flow chart for explaining an example of a processing sequence of a first performance evaluation process related to an test server;

FIG. 26 is a diagram for explaining a second performance evaluation method; and

FIG. 27 is a flow chart for explaining an example of a processing sequence of a second performance evaluation process related to the test server.

DESCRIPTION OF EMBODIMENTS

Preferred embodiments of the present invention will be described with reference to the accompanying drawings.

A description will now be given of a testing apparatus, a testing method, and a computer-readable storage medium in each embodiment according to the present invention.

Figure 1:
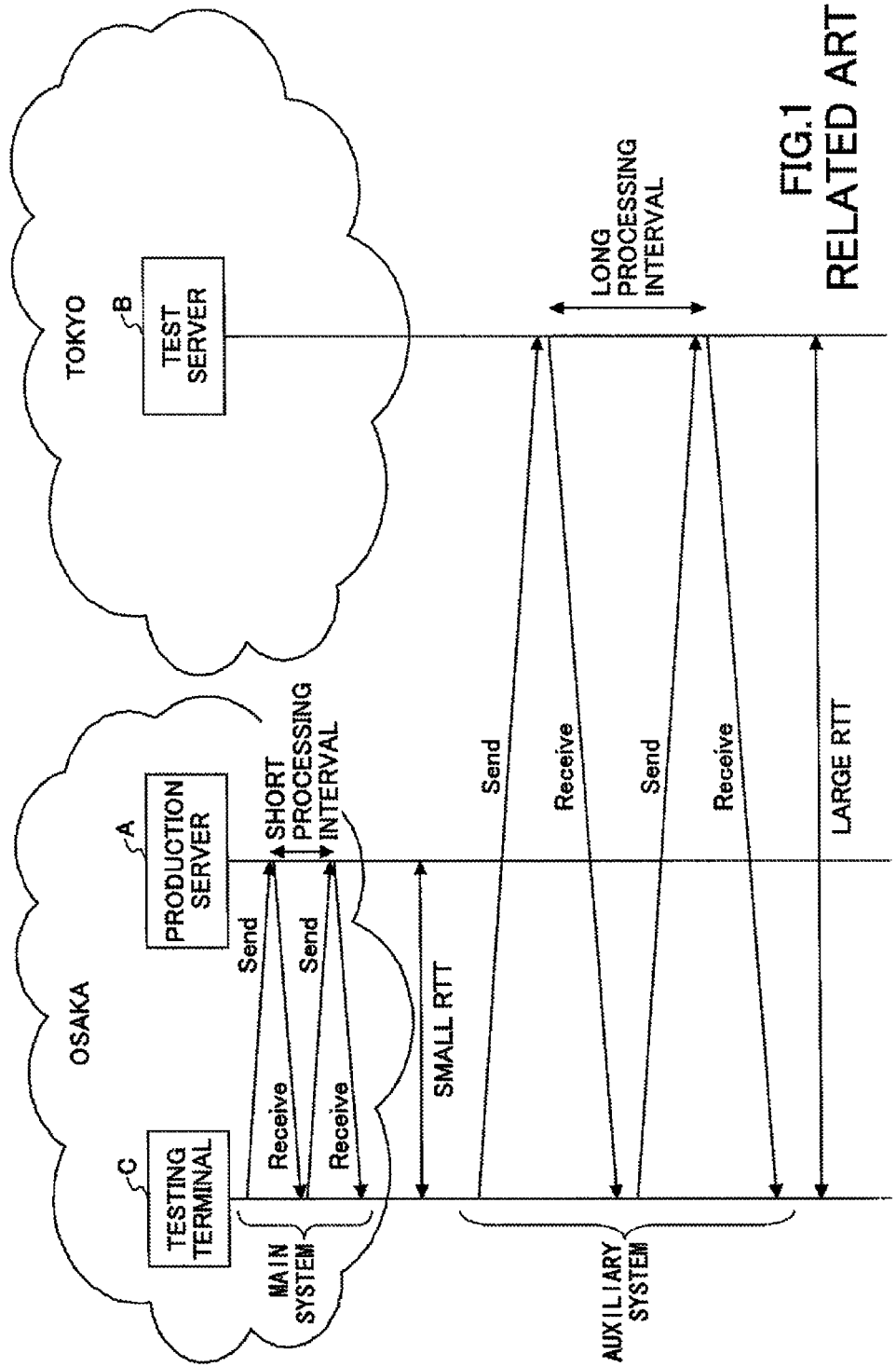
FIG. 1 is a diagram for explaining a first example of a performance evaluation test process related to the test server in the related art.
Figure 2:
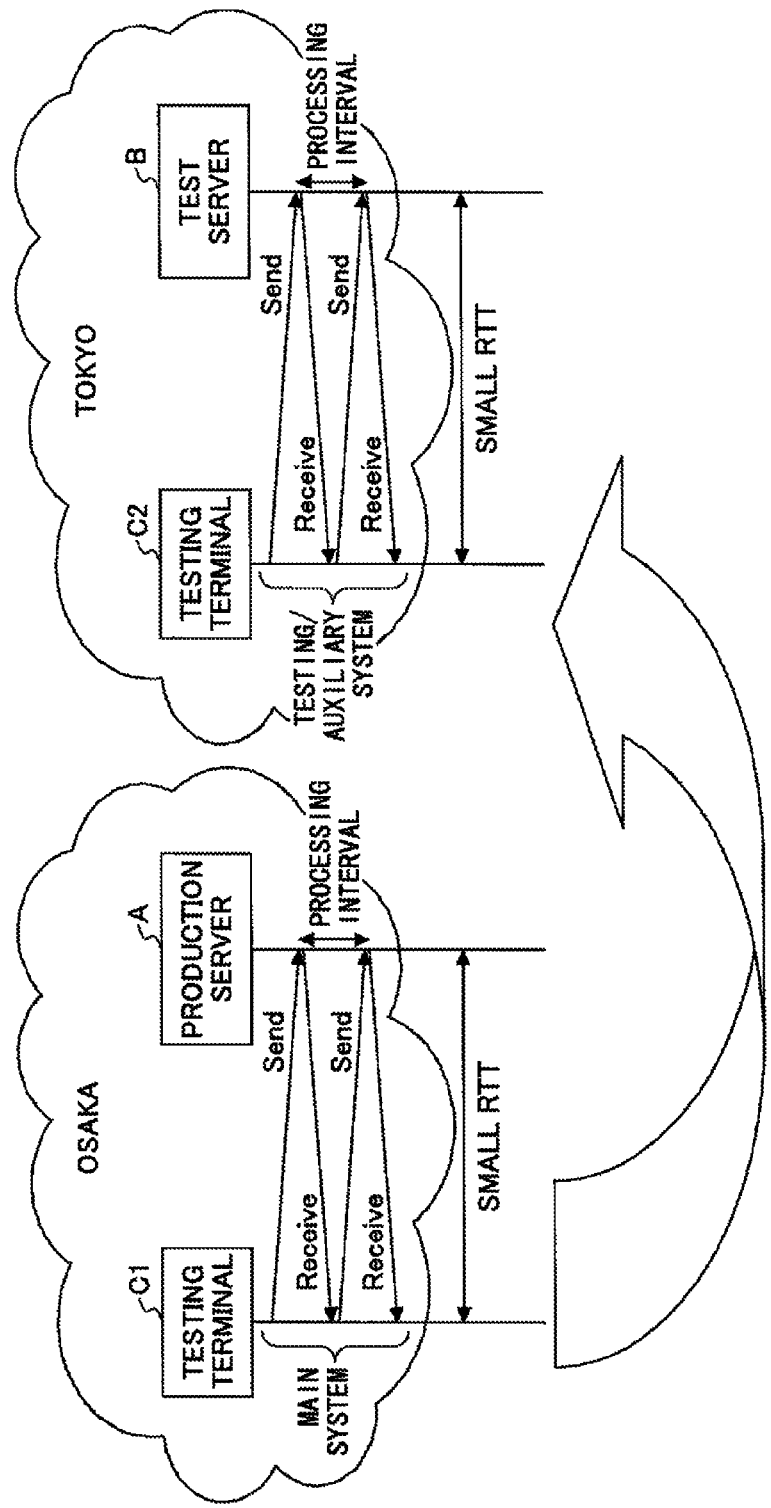
FIG. 2 is a diagram for explaining a second example of the performance evaluation test process related to the test server in the related art.
Figure 3:
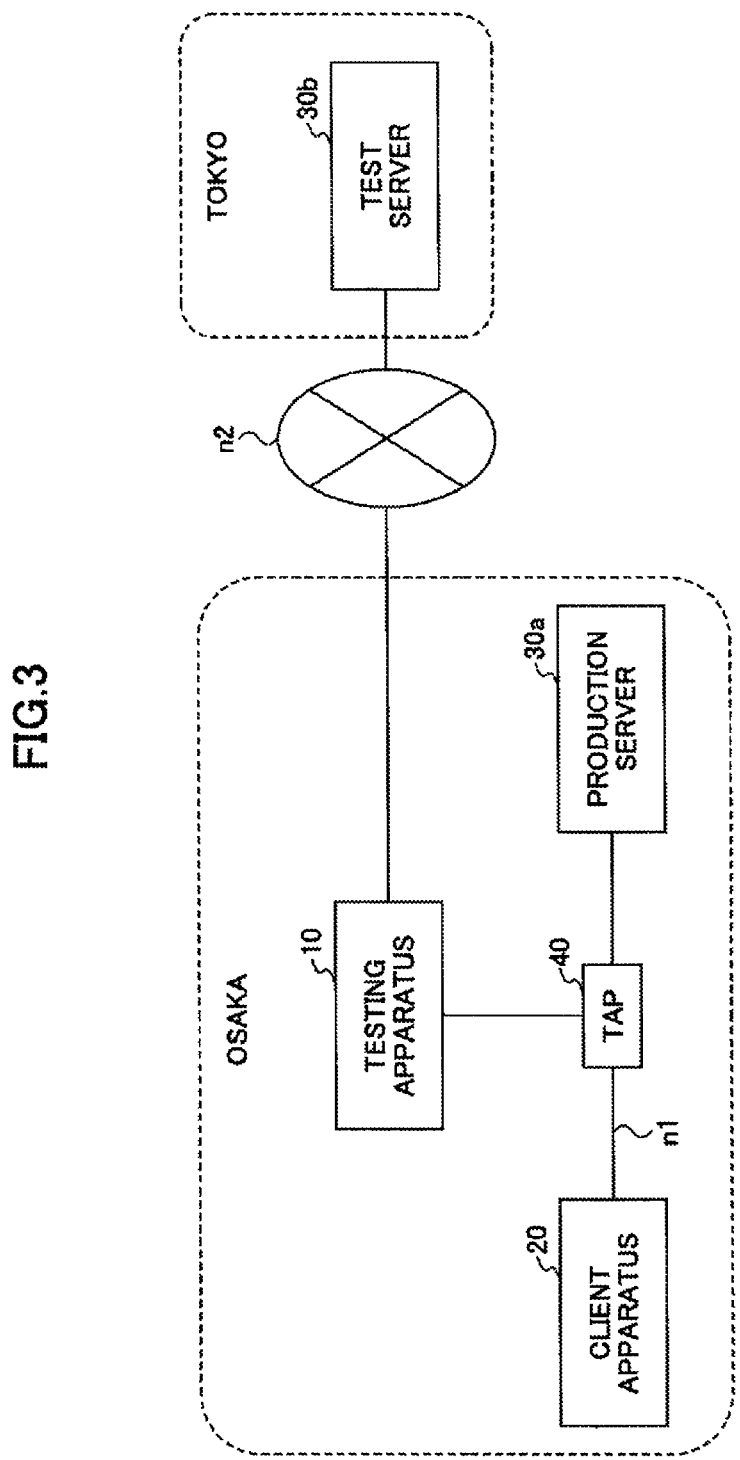
FIG. 3 is a diagram illustrating an example of a network structure in an embodiment.

FIG. 3 is a diagram illustrating an example of a network structure in an embodiment. In FIG. 3, a client apparatus 20 and a production server 30a are communicatably connected via a network n1. For example, the production server 30a may be formed by a working computer that is actually working (or running). The client apparatus 20 may be formed by a computer that makes a process request with respect to the production server 30a. A tap 40 may be formed by a network tap that branches signals flowing through the network n1 to a testing apparatus 10.

For example, the testing apparatus 10 may be formed by a computer that executes a process to perform a performance evaluation test on an test server 30b. The testing apparatus 10 may monitor the signals branched by the tap 40, and capture packets exchanged between the client apparatus 20 and the production server 30a via the network n1. The testing apparatus 10 may utilize the captured packets in order to execute the process to perform the performance evaluation test on the test server 30b.

For example, the test server 30b may be formed by a computer to which a move from the production server 30a is expected. In this embodiment, the test server 30b is a target of the performance evaluation test (that is, performance evaluation test target). The test server 30b basically includes functions identical to those of the production server 30a, because a relative performance with respect to the production server 30a for the same function becomes an evaluation target.

In this embodiment, it may be assumed for the sake of convenience that the testing apparatus 10, the client apparatus 20, and the production server 30a are located in Osaka, and that the test server 30b is located in Tokyo, for example. The locations are merely examples to illustrate a positional relationship such that a distance between the test server 30b and the testing apparatus 10 is not necessarily the same as a distance between the production server 30a and the client apparatus 20.

In the following description, a system formed by the client apparatus 20 and the production server 30a will be referred to as a "working system". On the other hand, a system formed by the testing apparatus 10 and the test server 30b will be referred to as an "inspecting system".

Figure 4:
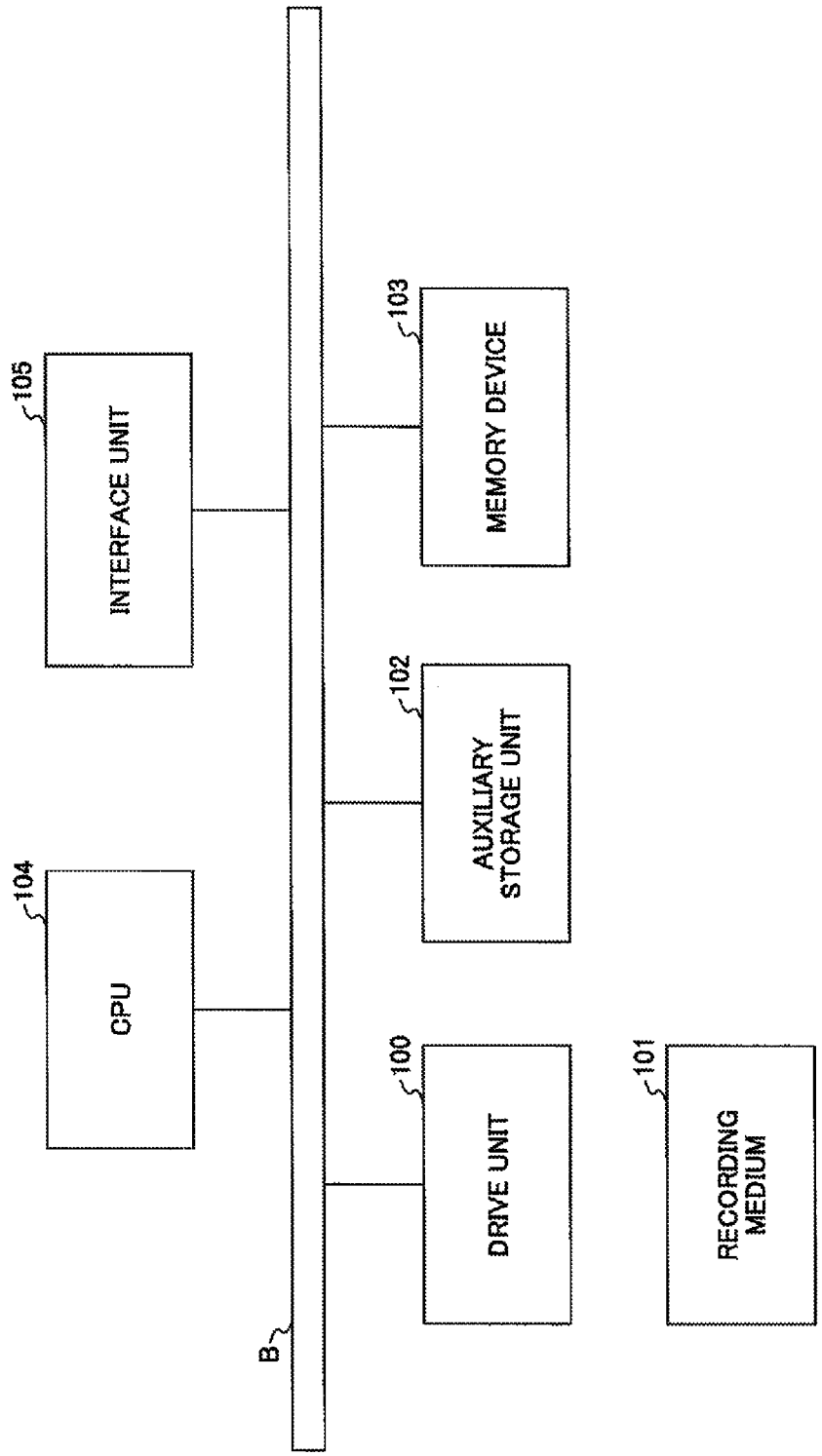
FIG. 4 is a block diagram illustrating an example of a hardware structure of a testing apparatus in the embodiment.

FIG. 4 is a block diagram illustrating an example of a hardware structure of the testing apparatus in this embodiment. The testing apparatus 10 illustrated in FIG. 4 includes a drive unit 100, an auxiliary storage unit 102, a memory device (storage) 103, a processing circuit (CPU (Central Processing Unit)etc.) 104, and an interface unit 105 that are connected via a bus B.

A program which, when executed by a computer such as the CPU 104, causes the computer to execute processes of the testing apparatus 10, may be provided in the form of a recording medium 101. When the recording medium 101 that stores the program is set in the drive unit 100, the program is installed to the auxiliary storage unit 102 from the recording medium 101 via the drive unit 100. The installing of the program to the auxiliary storage unit 102 may be performed by downloading the program from another computer (not illustrated) via a network, instead of using the recording medium 101. The auxiliary storage unit 102 may store one or more programs installed therein, as well as files, data, and the like that may be necessary.

The memory device 103 reads the program from the auxiliary storage unit 102 and stores the read program therein, in response to a program start (or boot) instruction. The CPU 104 executes the program stored in the memory device 103 in order to realize the functions of the testing apparatus 10. The interface unit 105 provides an interface between the testing apparatus 10 and the network to which the testing apparatus 10 is to be connected.

Examples of the recording medium 101 include portable recording media such as a CD-ROM (Compact Disk-Read Only Memory), a DVD (Digital Versatile Disk), a USB (Universal Serial Bus) memory, and the like. In addition, examples of the auxiliary storage unit 102 include a HDD (Hard Disk Drive), a flash memory, and the like. Each of the recording medium 101 and the auxiliary storage unit 102 may form a non-transitory computer-readable storage medium.

Figure 5:
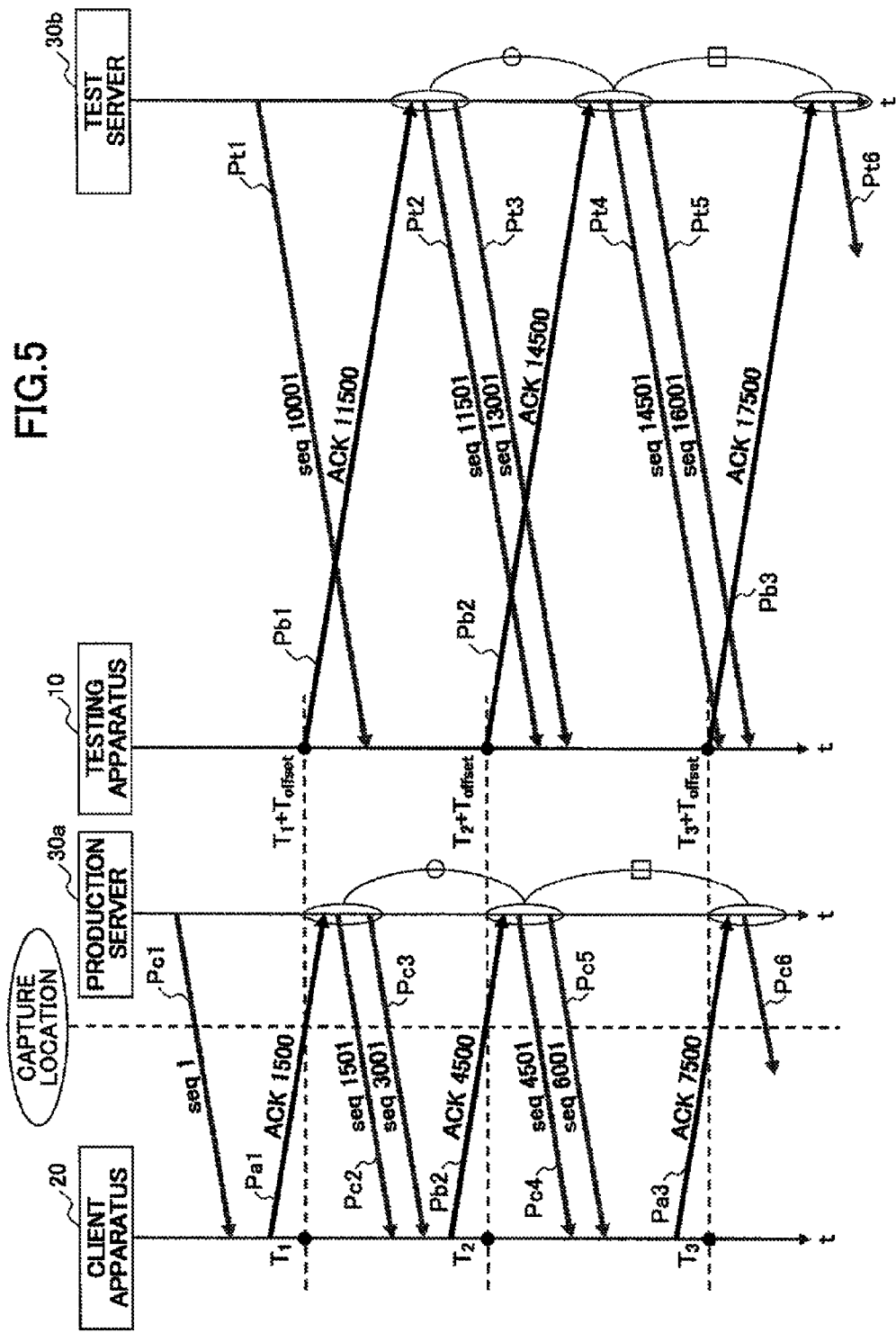
FIG. 5 is a diagram for explaining basic processing contents in the embodiment.

FIG. 5 is a diagram for explaining basic processing contents in this embodiment.

In FIG. 5, the client apparatus 20 sequentially sends uplink ACK (Acknowledge) packets Pa1, Pb2, and Pa3 to the production server 30a. The ACK packets Pa1, Pb2, and Pa3 are captured at times $T_1$, $T_2$, and $_T3$, respectively, by the testing apparatus 10. The testing apparatus 10 stores the contents of the captured ACK packets in a manner related to the captured time. In the following description, data stored in the testing apparatus 10 will be referred to as "captured data".

On the other hand, the production server 30a sequentially sends downlink packets Pc1, Pc2, Pc3, Pc4, Pc5, and Pc6 to the client apparatus 20. The packets Pct, Pc2, Pc3, Pc4, Pc5, and Pc6 are also captured by the testing apparatus 10. The testing apparatus 10 stores the contents of the captured packets in a manner related to the captured time.

The testing apparatus 10 converts the data (IP address, etc.) of the packet included in the captured data to conform to the inspecting system, and reproduces a communication log of the uplink packets in order to perform a test for making a performance evaluation related to the test server 30b. More particularly, the testing apparatus 10 sends the ACK packets Pb1, Pb2, and Pb3 to the test server 30b at times $T_1+T_{offset}$, $T_2+T_{offset}$, and $T_3+T_{offset}$, respectively, where $T_{offset}$ denotes a starting time of the test. The testing apparatus 10 does not wait for reception of a response packet with respect to the uplink packet. Accordingly, a time interval of the ACK packets Pb1, Pb2, and Pb3 may be made to match a time interval of the ACK packets Pa1, Pb2, and Pa3. The ACK packets Pb1, Pb2, and Pb3 correspond to the ACK packets Pa1, Pb2, and Pa3, respectively.

In the inspecting system, a relative relationship of an ACK number (response conformation number) and a sequence number of each packet is maintained to a relationship that is captured in the working system. More particularly, the relative relationship refers to intervals of the ACK number and the sequence number. In the example illustrated in FIG. 5, values obtained by adding "10000" to the ACK number and the sequence number of each packet in the working system respectively are the ACK number and the sequence number of each corresponding packet in the inspecting system.

By matching the time interval of each uplink packet in the inspecting system to the time interval of each corresponding packet in the working system, the test server 30b may receive packets similar to those received by the production server 30a at a time interval identical to that of the production server 30a. As a result, a load identical to that of the production server 30a may be applied with respect to the test server 30b. In other words, with respect to the time interval of the uplink packet, it may be possible to absorb effects on the test caused by the fact that the test server 30b is located at a remote location from the location where the production server 30a and the testing apparatus 10 are located.

In addition, with respect to the time interval of the downlink packet, it may also be possible to absorb effects on the test caused by the fact that the test server 30b is located at a remote location from the location where the production server 30a and the testing apparatus 10 are located. In other words, in a case in which a behavior of the test server 30b is perfectly identical to that of the production server 30a, the time interval of downlink packets Pt1, Pt2, Pt3, Pt4, Pt5 and Pt6 that are sent from the test server 30b may match the time interval of the downlink packets sent from the production server 30a. On the other hand, in a case in which the behavior of the test server 30b differs from that of the production server 30a, the time interval of the downlink packets sent from the test server 30b may differ from the time interval of the downlink packets sent from the production server 30a.

Accordingly, by comparing the time interface of the downlink packets from the inspecting system and the time interval of the downlink packets from the working system, for example, a performance evaluation may be made with respect to the test server 30b based on a load that is identical to that of the production server 30a. This performance evaluation is a relative performance evaluation with respect to the production server 30a.

FIG. 5 illustrates an example in which a source (or sender) of the uplink packet is converted into the testing apparatus 10. For this reason, a destination of the downlink packet sent from the test server 30b is the testing apparatus 10. The source of the uplink packet may remain to be the client apparatus 20. In this case, the testing apparatus 10 may capture the downlink packet from the test server 30b and store a log thereof.

According to the testing method illustrated in FIG. 5, it may be possible to eliminate the problem associated with the remote location of the test server 30b. However, the present inventors have observed through experimentations that the production server 30a and the test server 30b may behave differently even when the production server 30a and the test server 30b have identical hardware structures and identical software structures. For example, it was confirmed that there are cases in which a phenomenon illustrated in FIG. 6 occurs.

Figure 6:
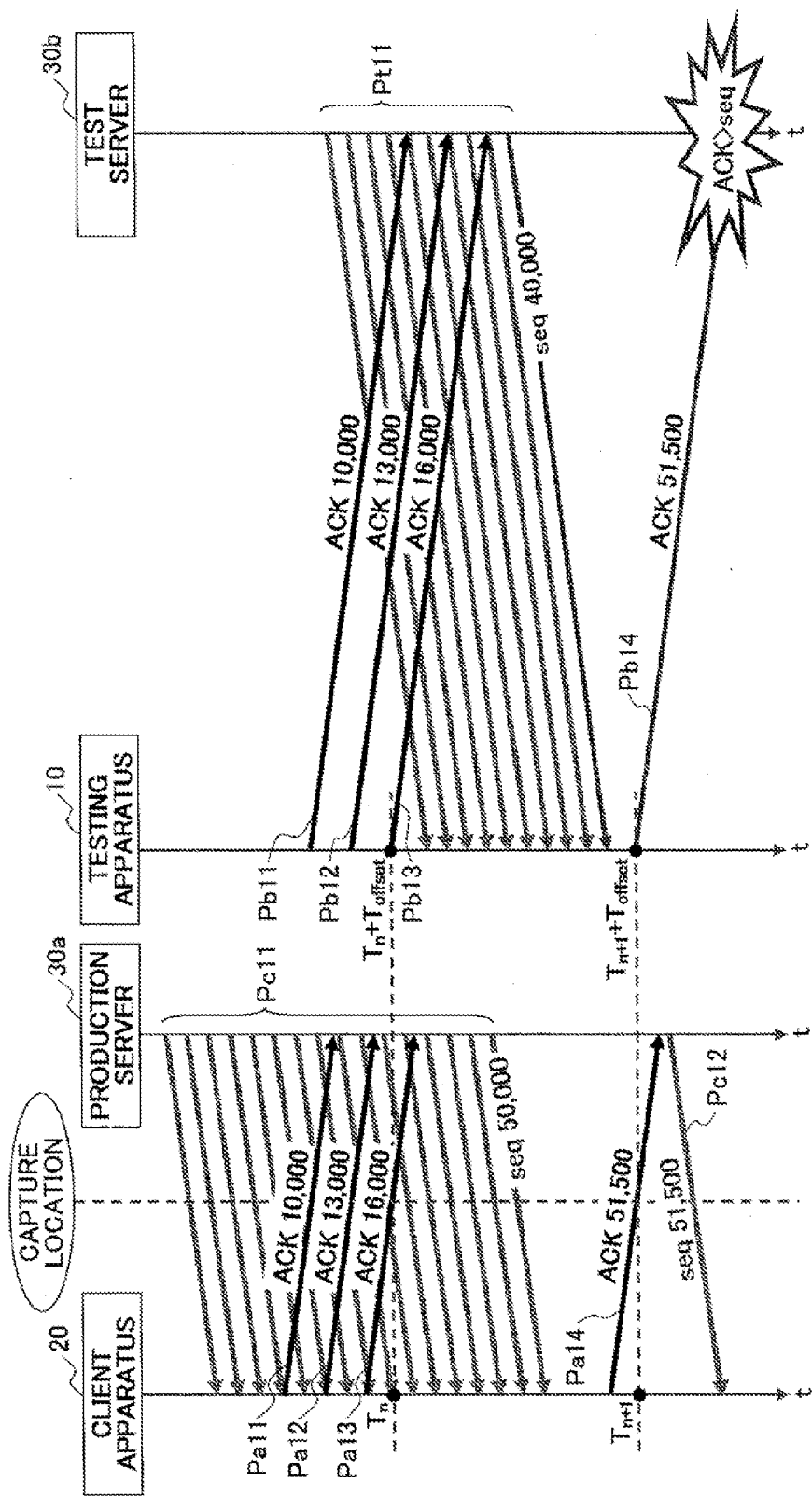
FIG. 6 is a diagram for explaining an example of a case in which a working system and an inspecting system behave differently.

FIG. 6 is a diagram for explaining an example of the case in which the working system and the inspecting system behave differently.

In the working system illustrated in FIG. 6, packets of a packet group Pc11 are consecutively sent from the production server 30a by a window control. After sending the packet having a sequence number "50000", the production server 30a stops sending the packet and assumes a standby (or listening) state. While the packet group Pc11 is sent, the client apparatus 20 sends uplink packets Pa11 through Pa13 to the production server 30a. Thereafter, while the production server 30a is in the standby state, the client apparatus 20 sends an ACK packet Pa14. The production server 30a sends a packet Pc12 in response to receiving the ACK packet Pa14.

In the inspecting system, the testing apparatus 10 sends uplink packets Pb11 through Pb14 at the same time interval as the packets Pa11 through Pa14 in the working system. For the sake of convenience, the ACK number of each packet in the inspecting system in FIG. 6 matches the ACK number of the corresponding packet in the working system.

On the other hand, the test server 30b assumes a standby (or listening) state after sending a packet group Pt11. The number of packets included in the packet group Pt11 is smaller than the number of packets included in the packet group Pc11. As a result, the packet that is sent last in the packet group Pt11 has a sequence number "40000".

Thereafter, the test server 30b receives the ACK packet Pb14 having an ACK number "51500" in a state in which the sequence number is "40000". At this point in time, the ACK number of the uplink packet exceeds the sequence number of the downlink packet in the test server 30b. Accordingly, the test server 30b judges this phenomenon to be an abnormal state, and stops sending the subsequent packets.

In FIG. 6, an arrow illustrating the packet sent from the production server 30a or the test server 30b may not necessarily indicate a sending in units of one packet, and may indicate a sending in units of a plurality of packets.

The present inventors analyzed the communication log (capture data) of the inspecting system, and found as a result of this analysis that the above described phenomenon in which the ACK number of the uplink packet exceeds the sequence number of the downlink packet (hereinafter also referred to as a "reversal phenomenon") occurs when the interval of the ACK numbers is large relative to the interval of the sequence numbers for the uplink packets. The present inventors also found that a typical cause of the difference in the behaviors of the production server 30a and the test server 30b may be a control mechanism of the TCP/IP (Transmission Control Protocol/Internet Protocol) communication.

In other words, after the communication starts in the TCP/IP communication, the client (client apparatus 20 or testing apparatus 10 in this embodiment) returns one ACK packet every time two packets are received from the server (production server 30a or test server 30b in this embodiment). Thereafter, depending on the lapse of time, the client consecutively receives a large number of (to or more) packets from the server, and returns one ACK packet with respect to the large number of packets received. The above described control is performed in order to realize an efficient communication, and is often referred to as a window control.

The number of packets simultaneously sent from the server may be determined depending on a congestion window size and/or an advertising window size of the server. The congestion window size may gradually decrease depending on sending of the packets from the server, and may gradually recover (or increase) depending on reception of the ACK packets. In a case in which the rate of decrease of the congestion window size is large compared to the rate of recovery of the congestion window size, the congestion window size may eventually be used up (or exhausted). When the congestion window size is used up, the server stops sending the packets, and assumes the standby state. When the server in the standby state receives the ACK packet from the client, the congestion window size may recover to a certain extent, for example. As a result, the server may be able to send the packets again.

When the above described window control is taken into consideration, it may be regarded that, in the production server 30a illustrated in FIG. 6, the congestion window size is used up after sending the packet having the sequence number "50000". It may also be regarded that, when the production server 30a receives the ACK packet Pa14, the congestion window size recovers, and as a result, the production server 30a may send the packet Pc12.

Similarly, in the test server 30b, it may be regarded that, in the test server 30b illustrated in FIG. 6, the congestion window size is used up after sending the packet having the sequence number "40000". In other words, it may be regarded that, for some reason, the congestion window size of the test server 30b illustrated in FIG. 6 becomes smaller than the congestion window size of the production server 30a, and the number of packets that may be sent consecutively from the test server 30b becomes smaller than that of the production server 30a.

In principle, when the server in the working system and the server in the inspecting system have identical performances, the change in the congestion window size should be the same between the two servers when the ACK packets are received by the two servers at identical time intervals. However, in actual practice, it may be understood that the change in the congestion window size may be difference between the working system and the inspecting system due to causes such as a network equipment connected to a communication channel, a fluctuation in the buffer size of the servers, and the like.

When the reversal phenomenon of the ACK number and the sequence number occurs, it becomes difficult to continue the test because the test server 30b stops sending the packets. For this reason, the tester may bear the burden of a large operation load.

Hence, in this embodiment, a description will be given of an example in which the reversal phenomenon of the ACK number and the sequence number is avoided.

In this embodiment, the testing apparatus 10 analyzes the capture data (communication log) of the working system, and measures the interval of the ACK numbers for the uplink ACK packets. In other words, the testing apparatus 10 calculates, with respect to the ACK number of each of the uplink ACK packets, a difference in relation to the ACK number of the immediately preceding ACK packet. When the difference greater than or equal to a threshold value is detected, the testing apparatus 10 additionally sends an uplink ACK packet (hereinafter also referred to as an "additional packet") between the two ACK packets (hereinafter also referred to as "target packets") having the ACK numbers having the difference greater than or equal to the threshold value. Hence, the additional packet does not reproduce the packet in the working system, but is an ACK packet that is sent only in the inspecting system. Between the two target packets, the preceding ACK packet will be referred to as a "preceding packet", and the subsequent ACK packet will be referred to as a "subsequent packet".

The additional packet is additionally sent because the ACK number of the subsequent packet has a high possibility of becoming larger than the sequence number of the test server 30b. By sending the additional packet, the recovery of the congestion window size of the test server 30b and the resuming of the packet sending by the test server 30b due to the recovery of the congestion window size may be expected. As a result, the reversal phenomenon of the ACK number and the sequence number may be avoided. The processing load of the ACK packet (including the additional packet) is relatively small, and the increase in the processing load of the test server 30b due to the addition of the additional packet may be regarded to be negligibly small.

Figure 7:
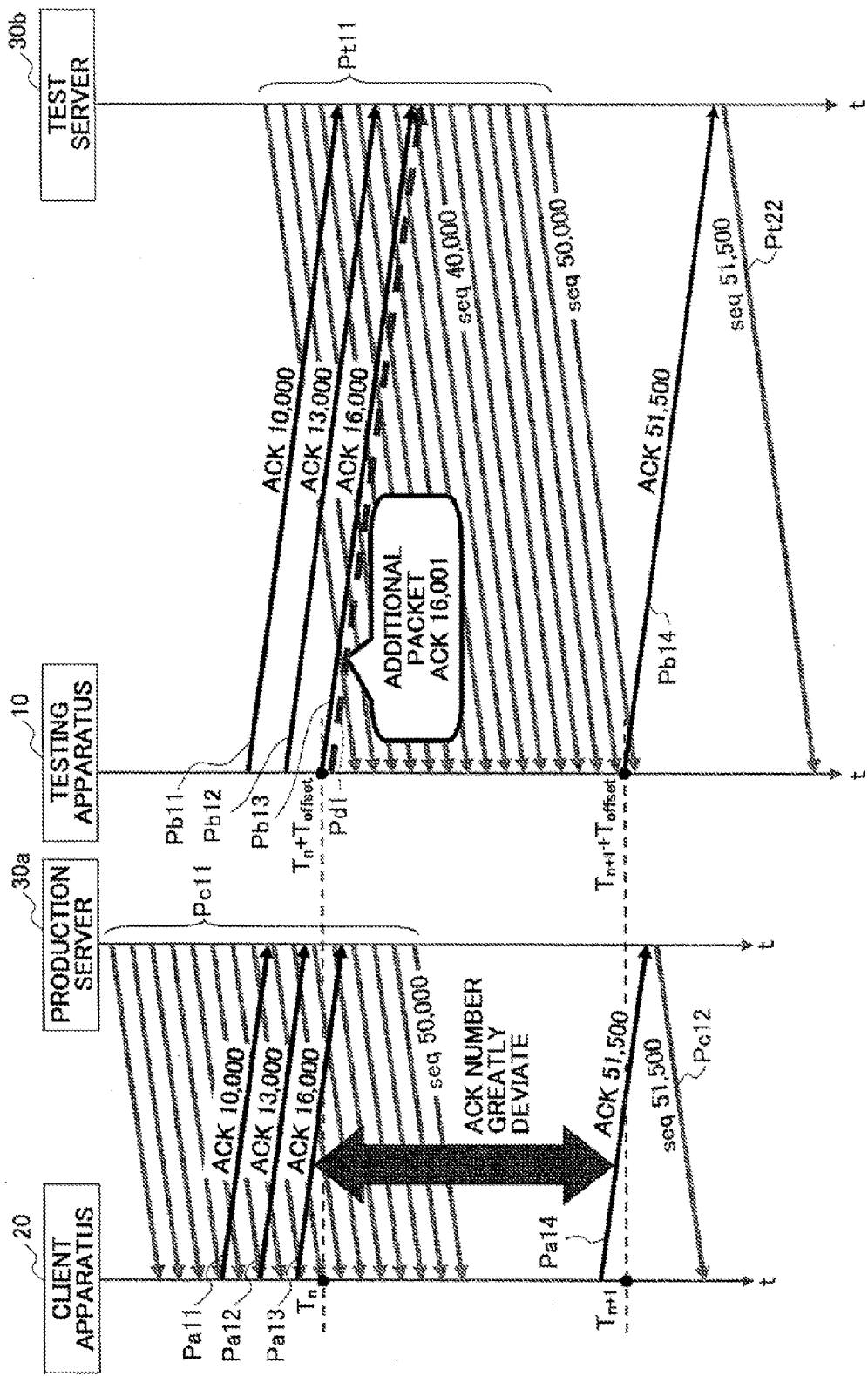
FIG. 7 is a diagram for explaining a first example of an additional packet.

FIG. 7 is a diagram for explaining a first example of the additional packet. In FIG. 7, those parts that are the same as those corresponding parts in FIG. 6 are designated by the same reference numerals, and a description thereof will be omitted.

In the working system illustrated in FIG. 7, the ACK number (16000) of the ACK packet Pa13 differs greatly from the ACK number (51500) of the ACK packet Pa14. When the testing apparatus 10 detects this state in which the two ACK numbers differ (or deviate) greatly based on a comparison of the interval between these two ACK numbers with respect to the threshold value, the testing apparatus 10 adds the additional packet between these two ACK packets. In other words, the testing apparatus 10 sends an additional packet Pd1 between the packet Pb13 that reproduces the packet Pa13 and the packet Pb14 that reproduces the packet Pa14. In the example illustrated in FIG. 7, the additional packet Pd1 has an ACK number "1601" that is obtained by adding "1" to the ACK number of the preceding packet Pb13. In FIG. 7 and the subsequent figures, the additional packet is illustrated by a dotted arrow in order to facilitate distinguishing the additional packet from the other packets.

In the test server 30b, the congestion window size recovers in response to receiving the additional packet Pd1. Hence, the packet group Pt11 then further includes the packet having the sequence number "50000", for example. As a result, when the ACK packet Pb14 is received by the test server 30b, the reversal phenomenon of the ACK number and the sequence number may be avoided.

Instead of judging whether to add the additional packet based on the interval of the ACK numbers, this judgement may be made based on an interval (time interval) between the communication times (captured times) of the packets. This is because, a correlation exists between the interval of the ACK numbers of the two packets and the time interval of the communication times of the two packets. In other words, the ACK numbers greatly differ when a large number of packets is sent from the production server 30a, because it takes a long time to send the large number of packets.

In this embodiment, there is a restriction such that the ACK number of the additional packet may not exceed the sequence number of the test server 30b. Accordingly, this restriction may be taken into consideration when setting appropriate values for the send time of the additional packet, the number of additional packets to be sent, and the ACK number of the additional packet. In the example illustrated in FIG. 7, one additional packet is sent. In addition, the send time of the additional packet Pd1 is immediately after the send time of the preceding ACK packet Pb13. Furthermore, the value obtained by adding "1" to the ACK number of the preceding packet Pb13 is the ACK number of the additional packet Pd1. However, FIG. 7 merely illustrates one example of the addition of the additional packet.

Figure 8:
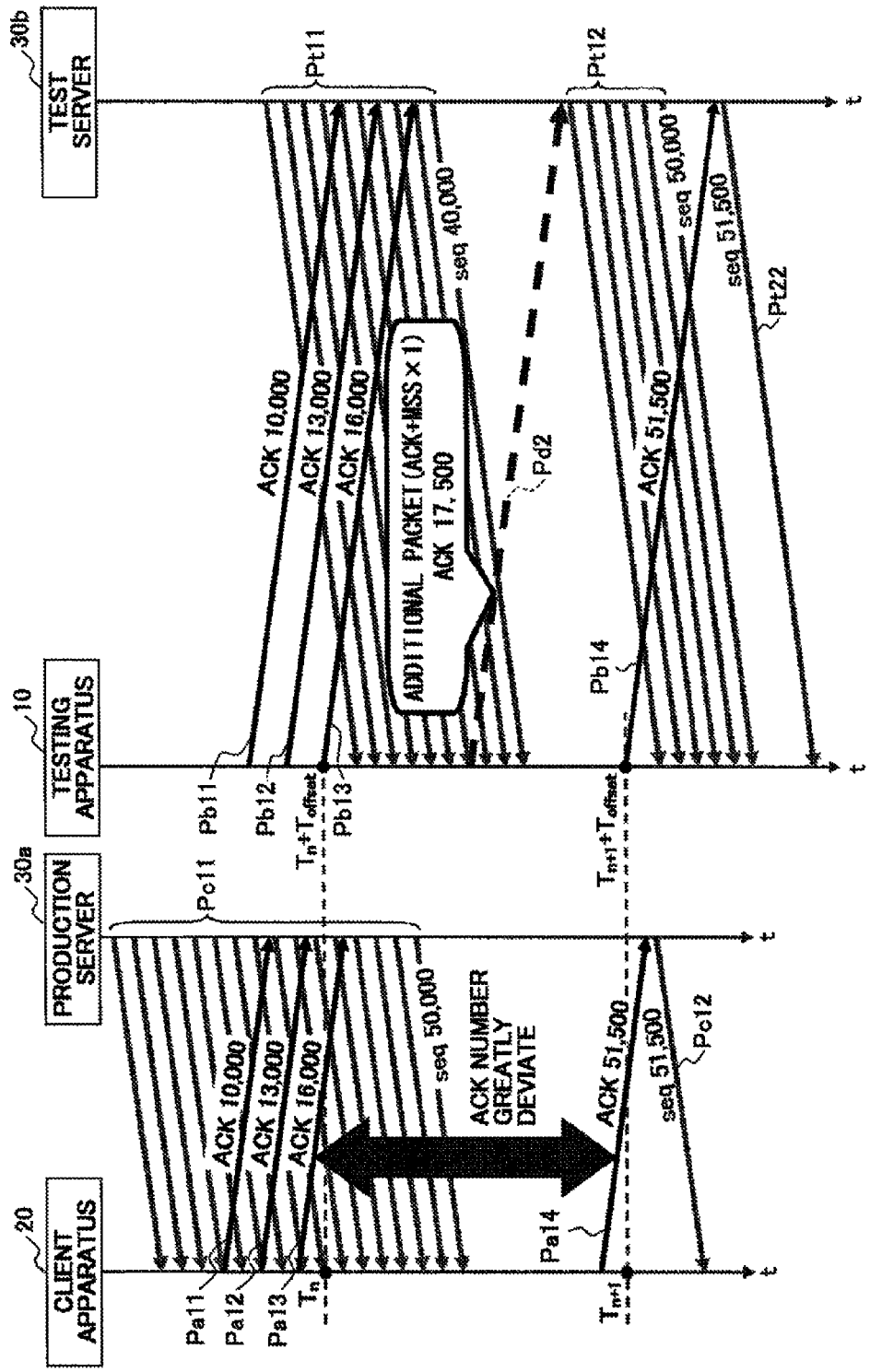
FIG. 8 is a diagram for explaining an example of an ACK number of the additional packet.

FIG. 8 is a diagram for explaining an example of the ACK number of the additional packet. In FIG. 8, those parts that are the same as those corresponding parts in FIG. 7 are designated by the same reference numerals, and a description thereof will be omitted.

FIG. 8 illustrates another example related to the ACK number of the additional packet. FIG. 8 illustrates an example in which a value obtained by multiplying an integer (that is, an integer multiple) of a MSS (Maximum Segment Size) of the test server 30b is added to the ACK number of the previous packet Pb13. In the TCP, the sending data is segmented and sent in units called segments. The maximum size of this segmenting unit is the MSS.

In this embodiment, it is assumed for the sake of convenience that the MSS of the test server 30b is 1500 bytes. Hence, in FIG. 8, the ACK number of an additional packet Pd2 is a value (17500) obtained by adding (1×MSS=1500) with respect to the ACK number (16000) of the ACK packet Pb13.

The additional packet Pd2 illustrated in FIG. 8 is sent at a time later than the sending of the additional packet Pd1 illustrated in FIG. 7, in order to illustrate that the additional packet does not necessarily have to be sent immediately after the preceding packet. As a result, the sequence number of the last packet of the packet group Pt11 sent from the test server 30b is "40000" in the example illustrated in FIG. 8. Thereafter, when the additional packet Pd2 is received by the test server 30b, the congestion window size of the test server Pd2 recovers, and the packet group Pt12 up to the sequence number "50000" is sent from the test server 30b. As a result, when the test server 30b receives the ACK packet Pb14, the reversal phenomenon of the ACK number and the sequence number may be avoided.

Figure 9:
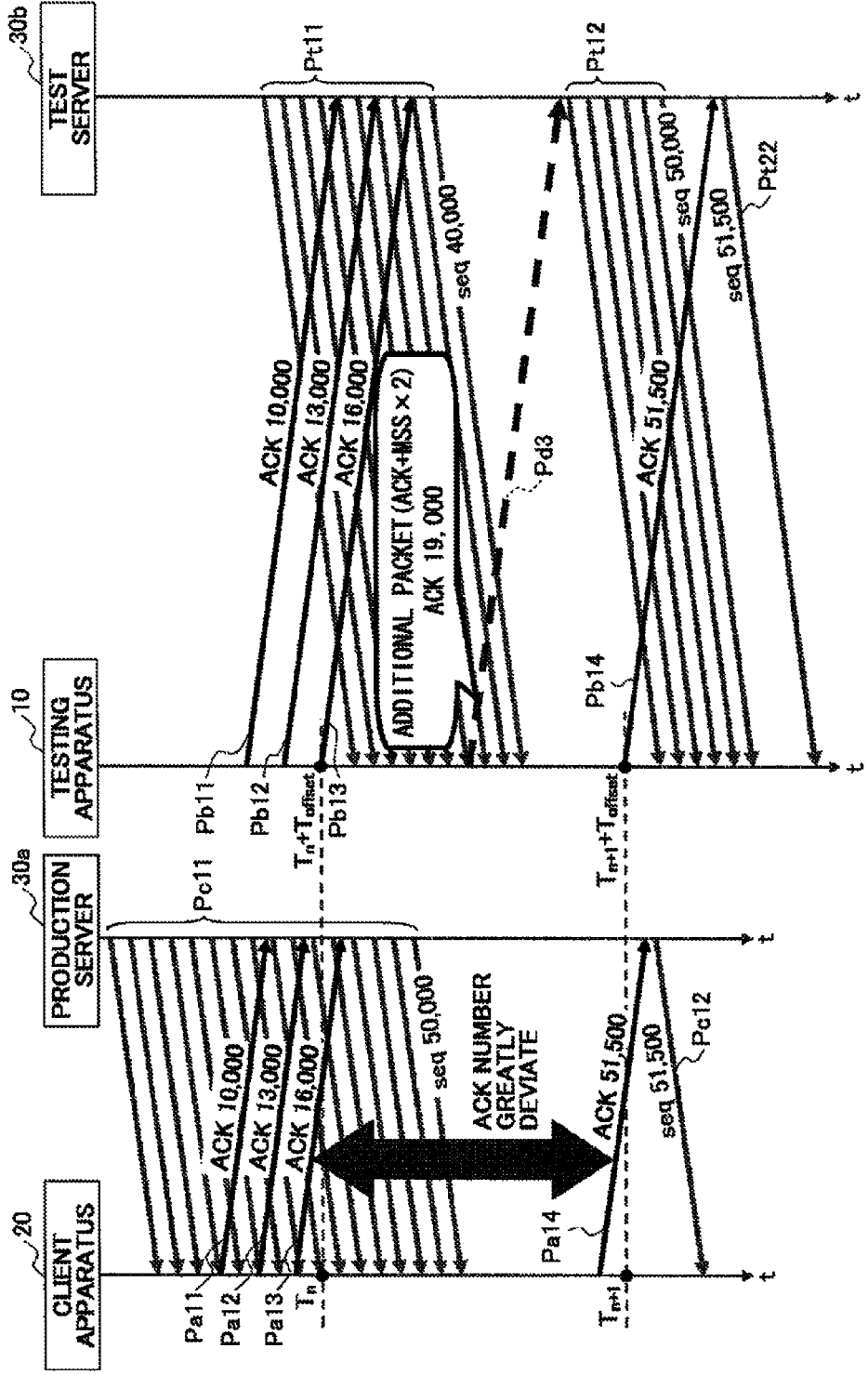
FIG. 9 is a diagram for explaining the example of the ACK number of the additional packet.

FIG. 9 is a diagram for explaining the example of the ACK number of the additional packet. In FIG. 9, those parts that are the same as those corresponding parts in FIG. 8 are designated by the same reference numerals, and a description thereof will be omitted.

In FIG. 9, the ACK number of an additional packet Pd3 is a value (19000) obtained by adding (2×MSS) to the ACK number (16000) of the preceding packet Pb13. Otherwise, the example illustrated in FIG. 9 is similar to that illustrated in FIG. 8.

The ACK number of the additional packet needs to be larger than the ACK number (16000) of the preceding packet Pb13 but smaller than the ACK number (51500) of the subsequent packet Pb14. Hence, to be on the safe side, the maximum value of the ACK number of the additional packet is desirably less than or equal to a sum of the ACK number of the preceding packet Pb13 and (2×MSS). This means that, in the example illustrated in FIG. 9, the ACK number of the additional packet is desirably 16001 or greater but 19000 or less. Here, "safe" means that the ACK number of the additional packet will not exceed the sequence number in the test server 30b. The maximum value of the ACK number of the additional packet is considered "safe" when it is less than or equal to a sum of the ACK number of the preceding packet Pb13 and (2×MSS), based on the communication rule of the packets between the client and the server. In other words, when implementing the TCP, every time the client receives a maximum of two packets from the server, the client sends one ACK packet. This means that, the minimum value of the interval (increasing width) of the ACK numbers in the server may be (2×MSS). Thus, when the maximum value of the interval of the ACK numbers in the client is set to (2×MSS), the possibility that the increasing width of the ACK number exceeds the increasing width of the sequence number may be regarded to be low. However, a maximum frequency at which (that is, a maximum of how frequent) the client sends the ACK packets may depend on the implementation of the TCP. Therefore, it may be desirable to determine the maximum value of the ACK number of the additional packet by taking into consideration the characteristics of the implementation of the TCP to be utilized.

Of course, the number of additional packets added between the two target packets is not limited to one.

Figure 10:
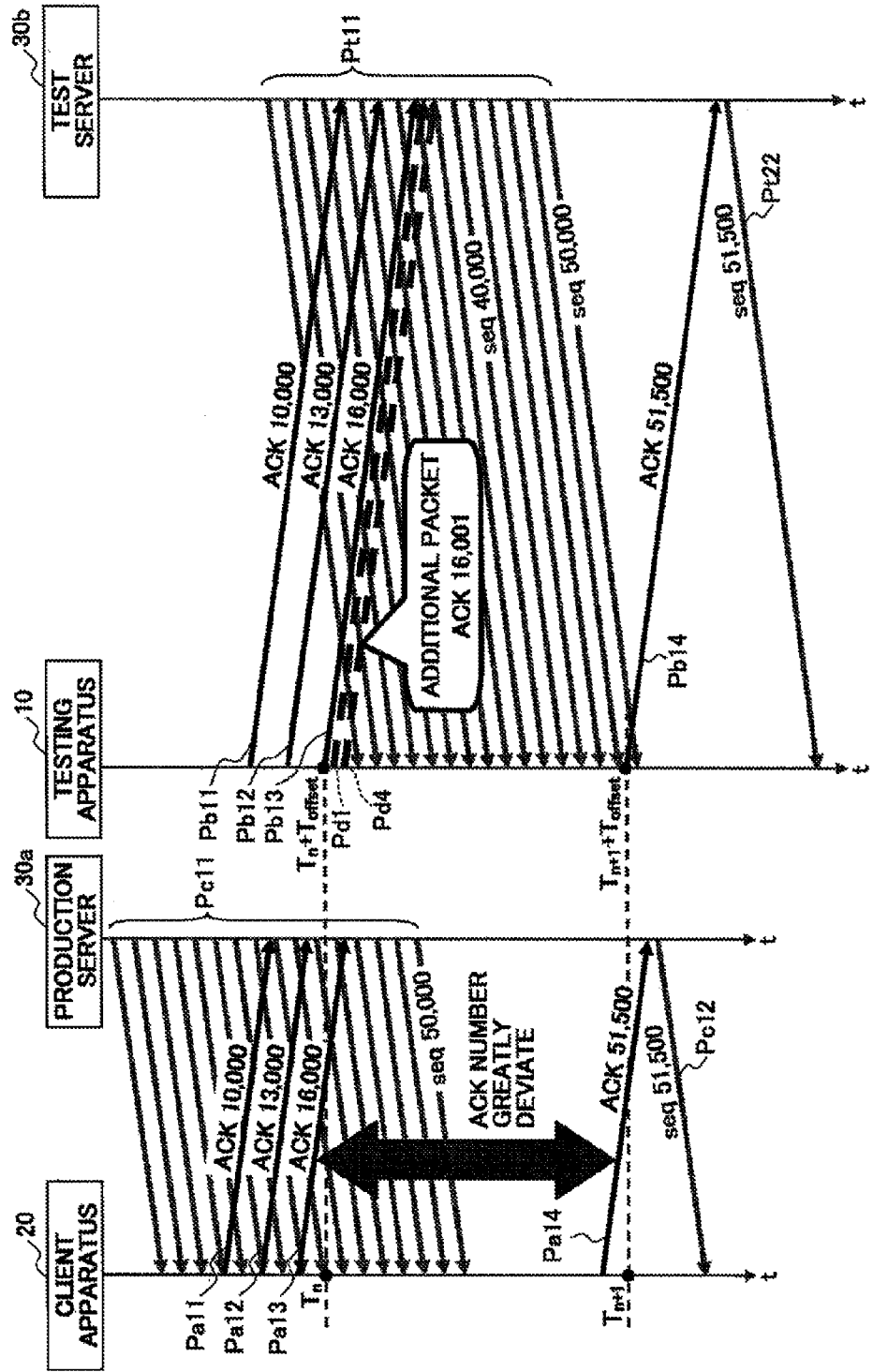
FIG. 10 is a diagram for explaining an example of a number of additional packets.

FIG. 10 is a diagram for explaining an example of the number of additional packets. In FIG. 10, those parts that are the same as those corresponding parts in FIG. 7 are designated by the same reference numerals, and a description thereof will be omitted.

In FIG. 10, the testing apparatus 10 sends two additional packets Pd1 and Pd4 having identical ACK numbers simultaneously or, consecutively, immediately after sending the ACK packet Pb13. A plurality of additional packets having identical ACK numbers may be sent as in this example. By sending a plurality of additional packets, it may be possible to increase the extent to which the congestion window size recovers in the test server 30b. In other words, the number of downlink packets from the test server 30b may be increased. As a result, when the ACK packet Pb14 is received by the test server 30b, the possibility of the reversal phenomenon of the ACK number and the sequence number may further be avoided.

When one additional packet is sent as in the example illustrated in FIG. 7, there is a possibility that the sequence number of the last packet of the packet group Pt11 may be smaller than "50000". In this case, when the ACK packet Pb14 is received by the test server 30b, the reversal phenomenon of the ACK number and the sequence number may occur. On the other hand, when a plurality of additional packets are sent as in the example illustrated in FIG. 10, the number of packets included in the packet group Pt11 may be increased. Consequently, the possibility of the reversal phenomenon of the ACK number and the sequence number occurring may further be reduced.

When the test server 30b receives three ACK packets having identical ACK numbers, the test server 30b may judge that a packet loss has occurred. Accordingly, the number of additional packets to be sent having identical ACK numbers is desirably two or less.

On the other hand, as long as the restriction that the number of additional packets having identical ACK numbers is two or less is followed, three or more additional packets may be sent.

Figure 11:
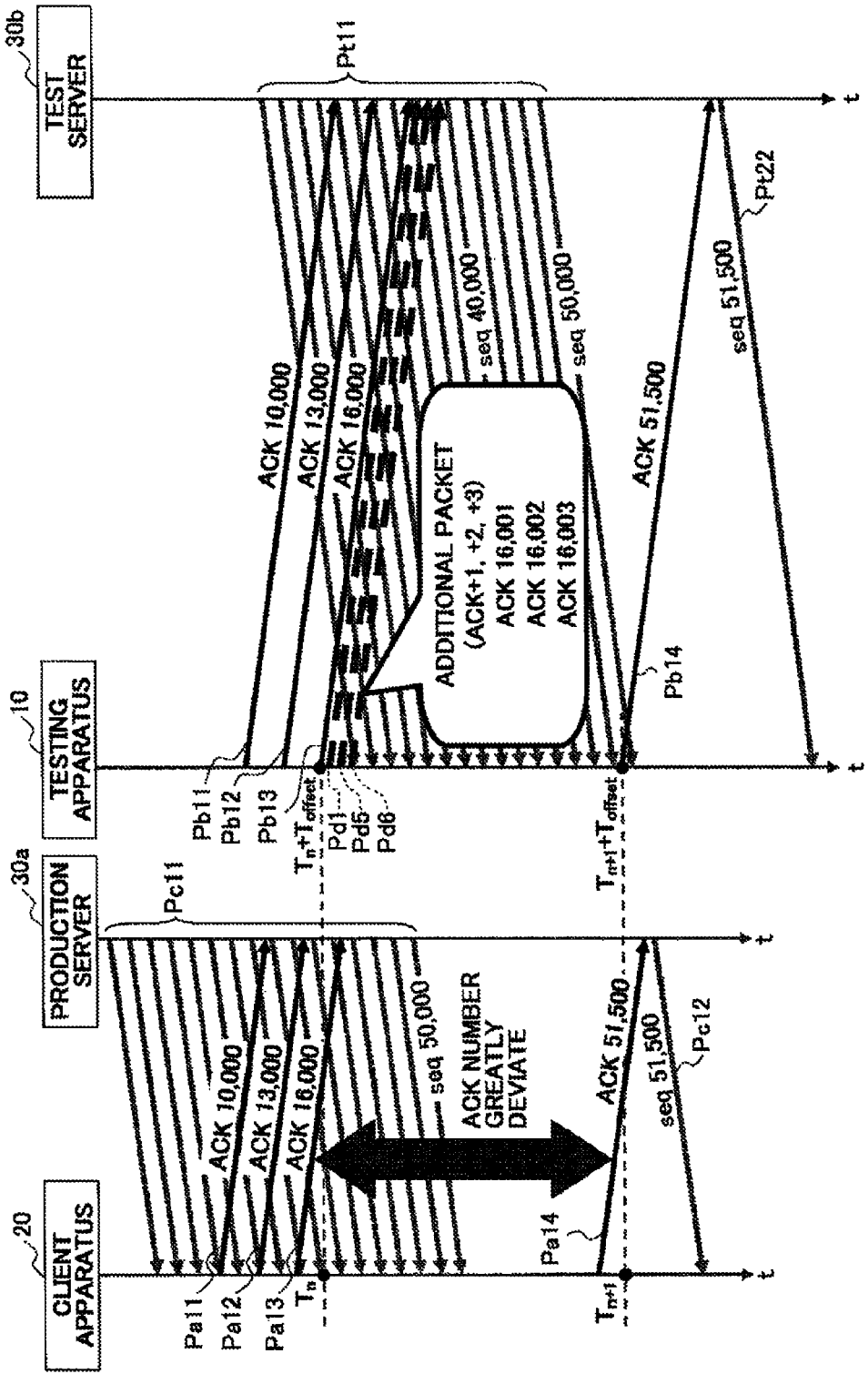
FIG. 11 is a diagram for explaining the example of the number of additional packets.

FIG. 11 is a diagram for explaining the example of the number of additional packets. In FIG. 11, those parts that are the same as those corresponding parts in FIG. 10 are designated by the same reference numerals, and a description thereof will be omitted.

In FIG. 11, three additional packets Pd1, Pd5, and Pd6 are added. The ACK numbers of the additional packets Pd1, Pd5, and Pd6 are mutually different and respectively are "16001", "16002", and "16003" in this order. Three or more additional packets may be added as long as the number of additional packets having identical ACK numbers is in a range of two or less.

In addition, when a plurality of additional packets are added, the interval of the ACK numbers of the additional packets may not be "1".

Figure 12:
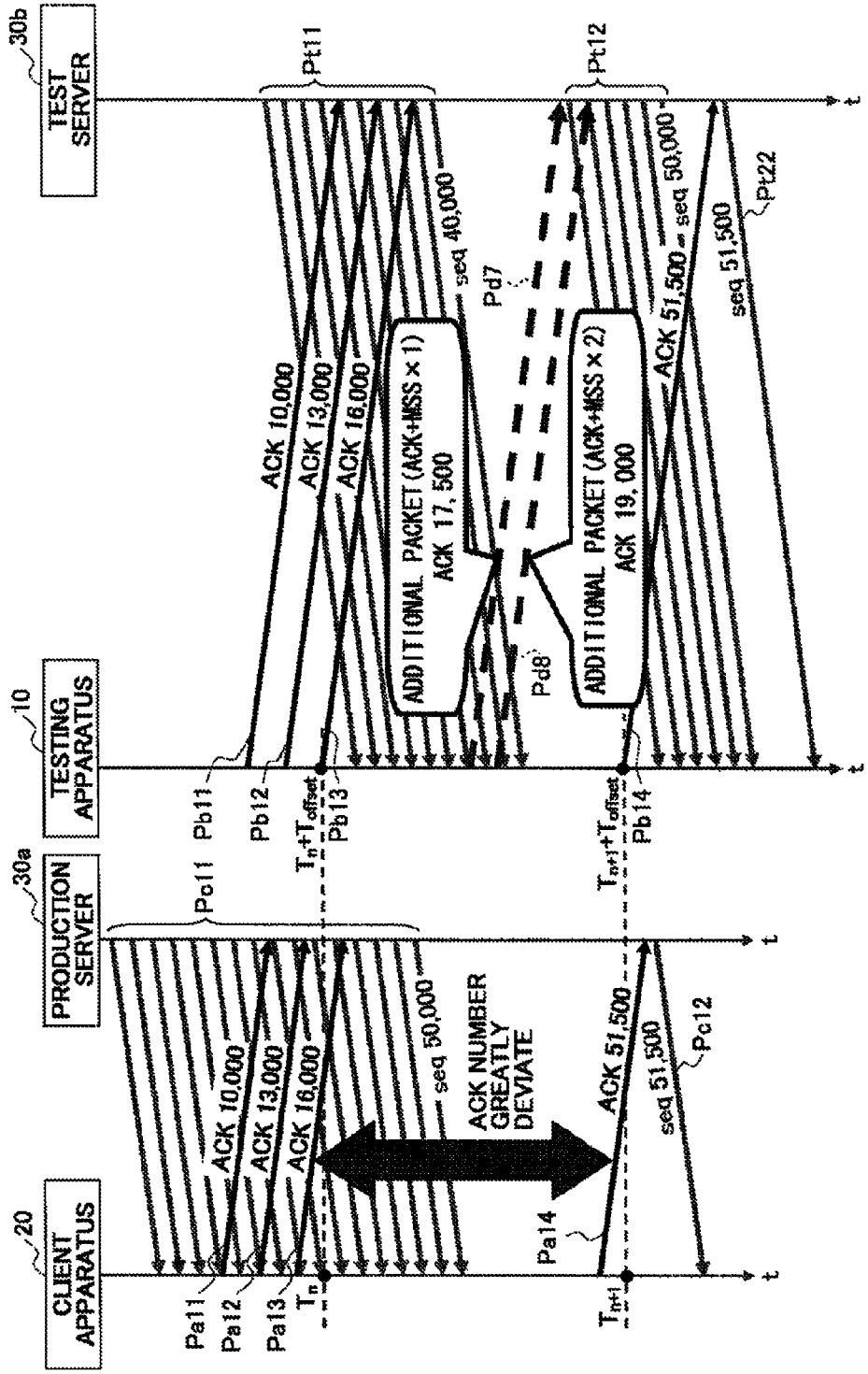
FIG. 12 is a diagram for explaining an example of an ACK number interval width between the additional packets.

FIG. 12 is a diagram for explaining an example of an ACK number interval width between the additional packets. In FIG. 12, those parts that are the same as those corresponding parts in FIG. 9 are designated by the same reference numerals, and a description thereof will be omitted.

In FIG. 12, two additional packets Pd7 and Pd8 are added. The interval of the ACK numbers of the two additional packets Pd7 and Pd8 is 1 MSS (=1500). In other words, the ACK number of the additional packet Pd7 is "17500", and the ACK number of the additional packet Pd8 is "19000".

Figure 13:
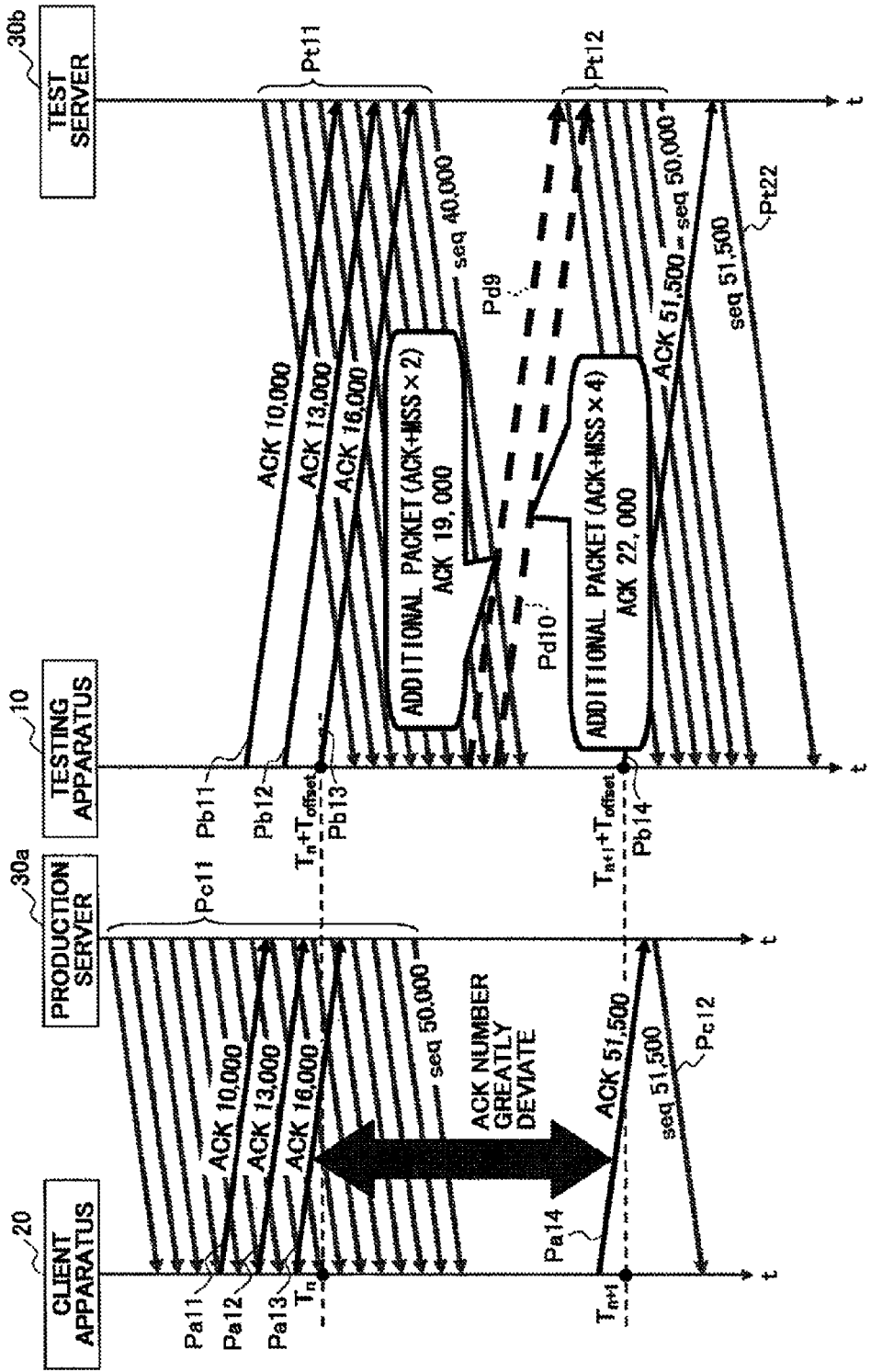
FIG. 13 is a diagram for explaining another example of the ACK number interval width between the additional packets.

FIG. 13 is a diagram for explaining another example of the ACK number interval width between the additional packets. In FIG. 13, those parts that are the same as those corresponding parts in FIG. 12 are designated by the same reference numerals, and a description thereof will be omitted.

In FIG. 13, two additional packets Pd9 and Pd10 are added. The interval of the ACK numbers of the two additional packets Pd9 and Pd10 is 2 MSS (=3000). In other words, the ACK number of the additional packet Pd9 is "19000", and the ACK number of the additional packet Pd10 is "22000".

Accordingly, the ACK number interval width of the additional packets may be other than "1". In addition, the ACK number interval width of the additional packets may be an integer multiple of MSS. For example, the ACK number interval width may be irregular. That is, when three or more additional packets are added, the ACK number interval width between the first additional packet and the second additional packet may be different from the ACK number interval width between the second additional packet and the third additional packet.

A minimum value of the number of additional packets between the target packets is "1". A maximum value of the number of additional packets between the target packets is obtained by dividing an ACK number interval DA between the target packets by the ACK number interval width of the additional packets and multiplying "2" to a result of this division. The value "2" is multiplied to the result of the division because the addition of two additional packets is tolerated.

In this embodiment, the ACK number interval DA between the target packets in the example illustrated in FIG. 7, etc. is 51500−16000=35500. When the ACK number interval width of the additional packets is "1" as in the example illustrated in FIG. 11, a maximum value of the number of additional packets is 355000/1×2=71000. In addition, when the ACK number interval width of the additional packets is 1 MSS (=1500) as in the example illustrated in FIG. 12, the maximum value of the number of additional packets is 23×2=46 because 355000/1500=23.6 . . . . Furthermore, when the ACK number interval width of the additional packets is 2 MSS (=3000) as in the example illustrated in FIG. 13, the maximum value of the number of additional packets is 11×2=22 because 355000/3000=11.83 . . . .

To be on the safe side so that the ACK number of the additional packet does not exceed the sequence number in the test server 30b, the maximum value of the ACK number of the additional packet may be (the ACK number of the preceding packet)+2×MSS or less. Hence, to be on the safe side, the maximum number of additional packets may be obtained by performing a calculation similar to that described above using 2×MSS (=3000) as the ACK number interval DA between the target packets.

Next, a description will be given of a timing at which the additional packets are sent. The send timing of the additional packets may be simultaneous as the preceding packet, immediately after the preceding packet, after a predetermined time elapses from the preceding packet, and after a time corresponding to an integer multiple of a RTT (Round Trip Time) elapses from the time when the preceding packet is sent.

Figure 14:
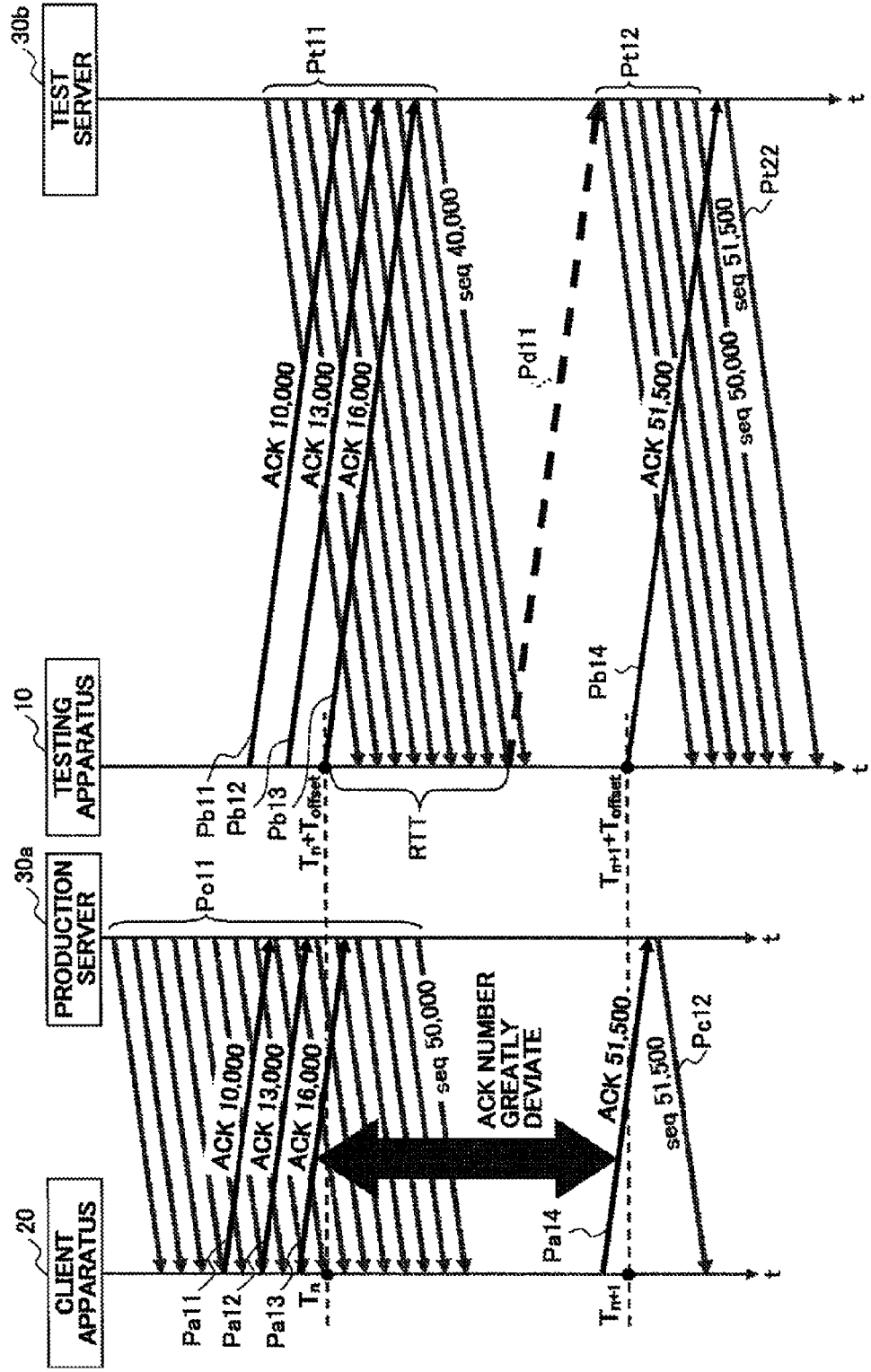
FIG. 14 is a diagram for explaining an example of a send timing of the additional packet.

For example, FIG. 14 is a diagram for explaining an example of a send timing of the additional packet. In FIG. 14, those parts that are the same as those corresponding parts in FIG. 13 are designated by the same reference numerals, and a description thereof will be omitted.

FIG. 14 illustrates an example in which an additional packet Pd11 is sent after the RTT elapses from the time when the preceding packet Pb13 is sent.

On the other hand, a final time (hereinafter referred to as a "final tolerable send time") that is tolerable as the send timing of the additional packet may be obtained in the following manner. First, the test server 30b calculates a required time that is required to finish sending all of the packets having the ACK numbers less than the ACK number of the subsequent packet Pb14, until the subsequent packet Pb14 reaches the test server 30b. The final tolerable send time of the additional packet is the time obtained by subtracting the required time from the send time of the subsequent packet Pb14.

Figure 15:
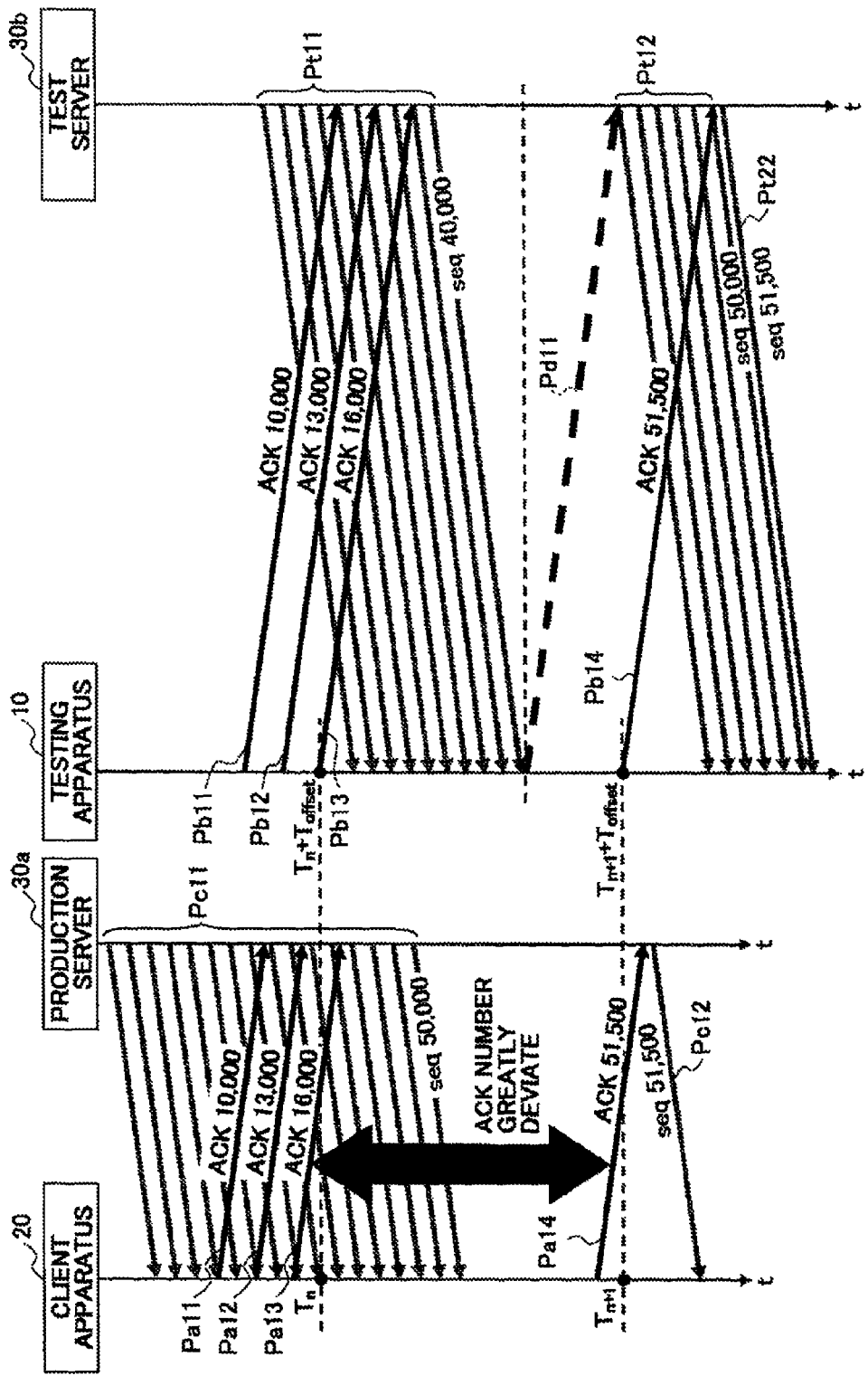
FIG. 15 is a diagram for explaining a final tolerable send time of the additional packet.

FIG. 15 is a diagram for explaining the final tolerable send time of the additional packet. In FIG. 15, those parts that are the same as those corresponding parts in FIG. 14 are designated by the same reference numerals, and a description thereof will be omitted.

In FIG. 15, it is assumed for the sake of convenience that the send time interval of the packets by the test server 30b is 0.2 milliseconds (msec). Until the subsequent packet Pb14 reaches the test server 30b, the test server 30b needs to send the packets from the packet having the sequence number "41500" to the packet having the sequence number "50000". Otherwise, the reversal phenomenon of the ACK number and the sequence number may occur at the time when the subsequent packet Pb14 is received. Hence, the final tolerable send time of the additional packet Pd14 may be obtained from $T_{n+1}+T_{offset}-(5000-41500)\times 0.2$, where $T_{n+1}+T_{offset}$ is the send time of the subsequent packet Pb14.

Next, a more detailed description will be given of a functional structure of the testing apparatus 10 and processing contents of the testing apparatus 10.

Figure 16:
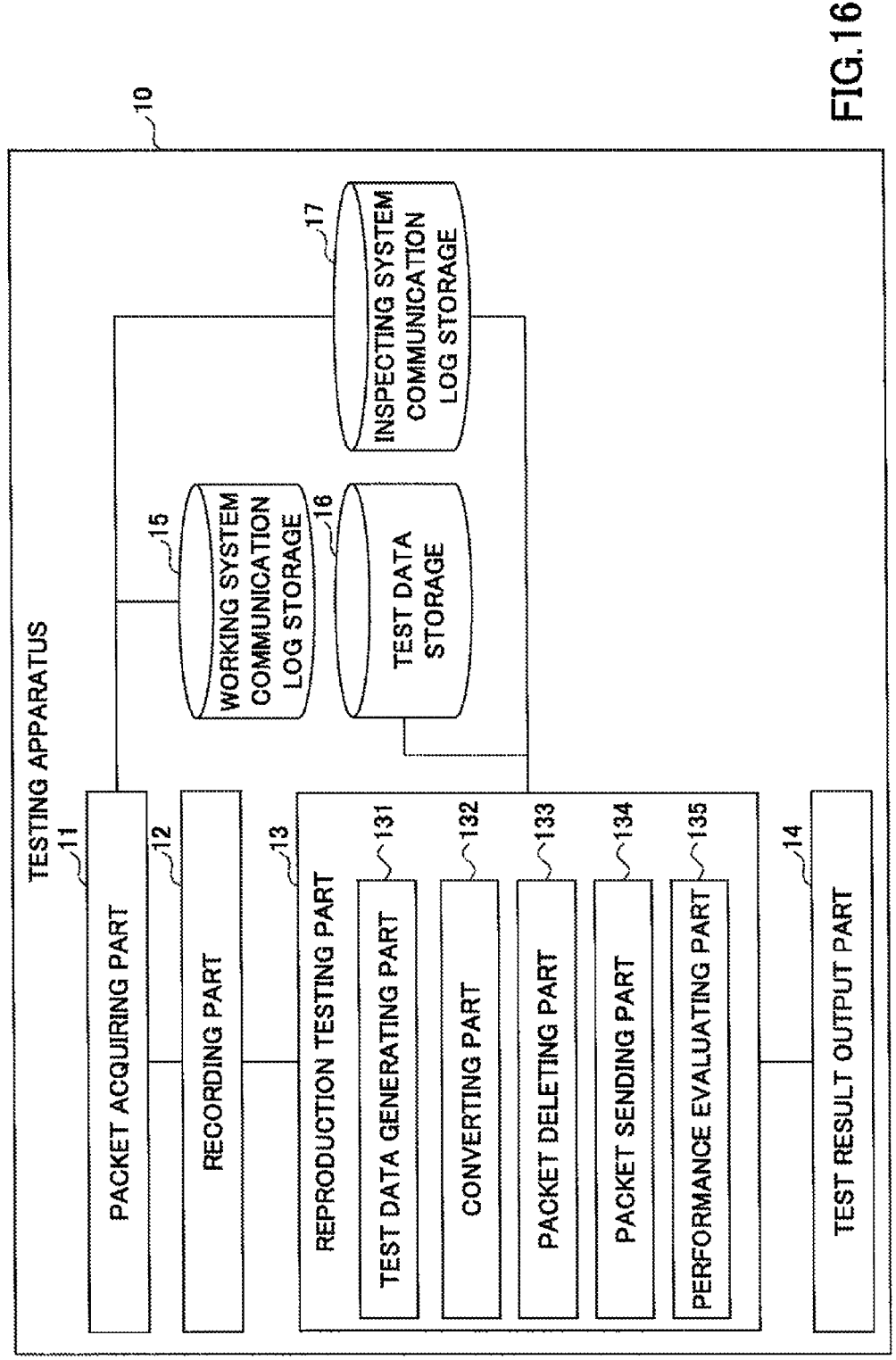
FIG. 16 is a block diagram illustrating an example of a functional structure of the testing apparatus in the embodiment.

FIG. 16 is a block diagram illustrating an example of the functional structure of the testing apparatus in the embodiment. The testing apparatus 10 illustrated in FIG. 16 includes a packet acquiring part 11, a recording part 12, a reproduction test part 13, a test result output part 14, a working system communication log storage 15, a test data storage 16, an inspecting system communication log storage 17, and the like. The packet acquiring part 11, the recording part 12, the reproduction test part 13, the test result output part 14, and the like may be realized by processes that are performed when the CPU 104 executes one or more programs installed in the testing apparatus 10. The working system communication log storage 15, the test data storage 16, the inspecting system communication log storage 17, and the like may be realized by use of the memory device 103 and/or the auxiliary storage unit 102.

The packet acquiring part 11 monitors the TCP/IP communication in the network n1, and captures (or acquires) the packets in the working system. In addition, the packet acquiring part 11 monitors the packets sent from the testing apparatus 10 and the packets received by the testing apparatus 10, and captures (or acquires) the packets in the inspecting system.

Of the packets captured by the packet acquiring part 11, the recording part 12 records data related to the packet of the working system into the working system communication log storage 15, and records data related to the packet of the inspecting system into the inspecting system communication log storage 17. As a result, a communication log of the working system is stored in the working system communication log storage 15. In addition, a communication log of the inspecting system is stored in the inspecting system communication log storage 17. The recording part 12 judges whether the captured packet is a packet of the working system or a packet of the inspecting system, based on a source (or sender) IP address or a destination IP address of the captured packet. In this embodiment, the working system communication log storage 15 forms an example of a first storage, and the inspecting system communication log storage 17 forms an example of a second storage.

The reproduction test part 13 reproduces a communication sequence of an uplink packet in the working system using the communication log stored in the working system communication log storage 15, and evaluates the performance of the test server 30b based on a communication sequence of a downlink packet that is returned from the test server 30b in response to the reproduced communication sequence of the uplink packet in the working system. The data related to the packet that is sent to the test server 30b and the data related to the packet that is returned from the test server 30b, due to the process performed by the reproduction test part 13, are captured by the packet acquiring part 11 as described above, and are stored in the inspecting system communication log storage 17 by the recording part 12.

The test result output part 14 outputs a test result (or evaluation result) of the reproduction test part 13. The manner in which the test result is output from the test result output part 14 is not limited to a particular manner. For example, the data indicating the test result may be stored in the auxiliary storage unit 102 or, may be displayed on a display unit, for example.

In FIG. 16, the reproduction test part 13 includes a test data generating part 131, a converting part 132, a packet deleting part 133, a packet sending part 134, and a performance evaluating part 135.

Of the communication log stored in the working system communication log storage 15, the data related to the uplink packet is transferred (or copied) to the test data storage 16 by the test data generating part 131. When making the copy, the test data generating part 131 measures the interval of the ACK numbers between the uplink ACK packets. When the measured interval greater than or equal to a preset threshold value is detected, the test data generating part 131 adds an additional packet between the target packets having the detected interval. In other words, the test data generating part 131 in this embodiment forms an example of a processing circuit or an adding part.

The converting part 132 performs a conversion process with respect to the packet stored in the test data storage 16, in order to adapt the packet to the inspecting system. For example, the conversion process converts the source IP address, the destination IP address, the ACK number, and the like.

The packet detecting part 133 deletes (or discards) the additional packet when it is judged that the additional packet is unnecessary as a result of starting the test in the inspecting system. For example, the additional packet may be judged as being unnecessary when it is judged that the congestion window size of the test server 30b has not become smaller than the congestion window size of the production server 30a.

The performance evaluating part 135 evaluates the performance of the test server 30b based on the communication log stored in the inspecting system communication log storage 17. For example, with respect to the performance of the test server 30b, the performance evaluating part 135 may output a comparison result that is obtained by comparing the performance of the test server 30b and the performance of the production server 30a.

Figure 17:
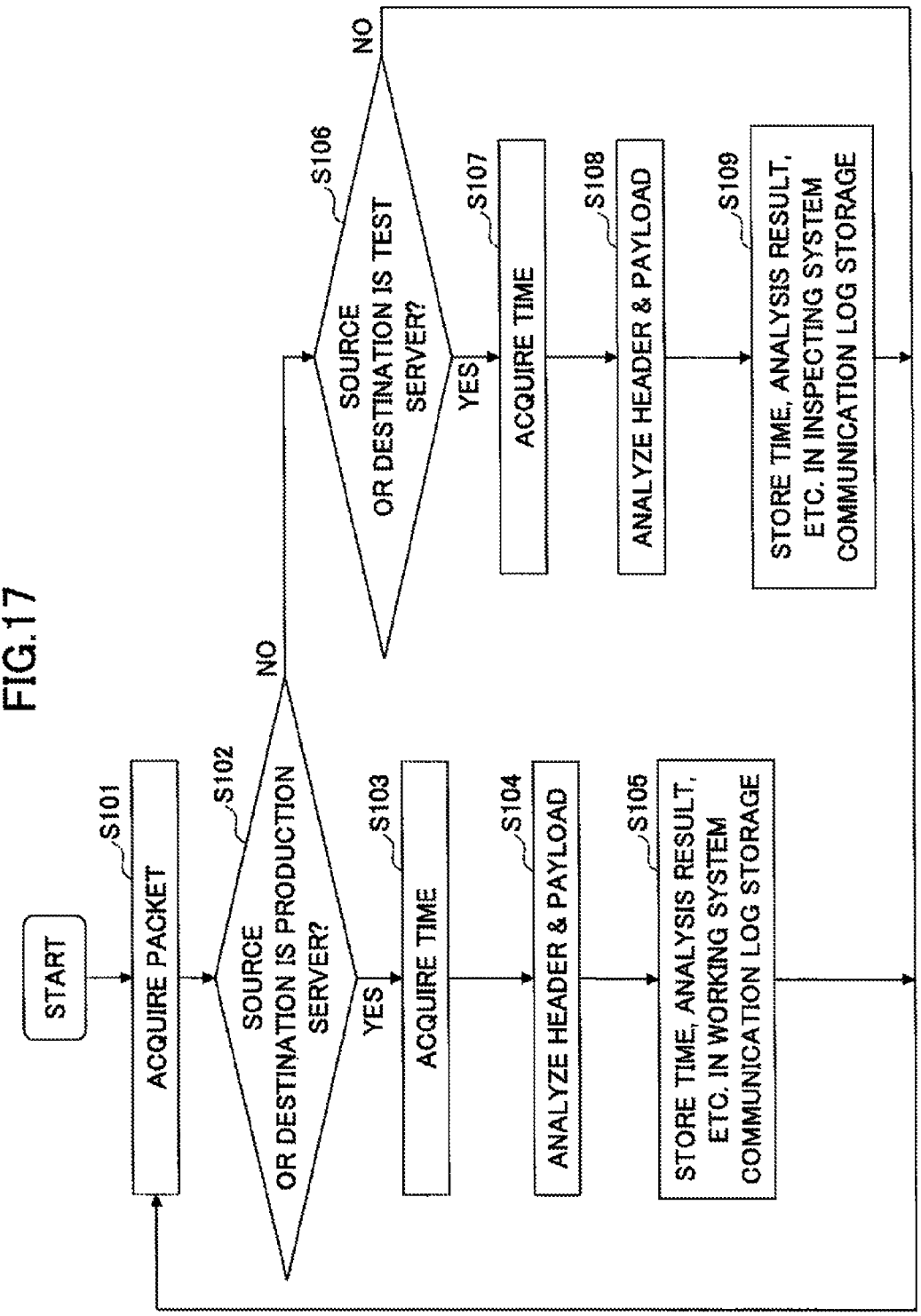
FIG. 17 is a flow chart for explaining an example of a processing sequence of a packet capturing process of the testing apparatus.

Next, a description will be given of a processing sequence that is executed by the testing apparatus 10, by referring to FIG. 17. FIG. 17 is a flow chart for explaining an example of a processing sequence of a packet capturing process of the testing apparatus.

In a step S101 illustrated in FIG. 17, the packet acquiring part 11 acquires the packet via the interface unit 105. Next, in a step S102, the packet acquiring part 11 refers to an IP header of the acquired packet, and judges whether the source IP address or the destination IP address of the acquired packet matches the IP address of the production server 30*a*. In other words, a judgement is made to determine whether the acquired packet is related to the communication in the working system. The auxiliary storage unit 102 of the testing apparatus 10 prestores the IP addresses of the production server 30*a* and the test server 30*b*.

When the source IP address or the destination IP address of the acquired packet matches the IP address of the production server 30*a* and the judgement result in the step S102 is Yes, the recording part 12 acquires a present time from a timer (or clock) of the testing apparatus 10 in a step S103. Then, in a step S104, the recording part 12 analyzes a header and a payload of each layer within the packet. Thereafter, in a step S105, the recording part 12 records the present time and the analysis result of the packet in the working system communication log storage 15.

Accordingly, the steps S103 through S105 are performed every time a packet related to the working system is acquired. As a result, the communication log of the working system is accumulated in the working system communication log storage 15.

FIG. 18 is a diagram illustrating an example of a structure of the working system communication log storage. In FIG. 18, the working system communication log storage 15 stores a session ID, a time, a source IP address, a destination IP address, a source port number, a destination port number, a sequence number, an ACK number, a SYN (Synchronize) flag, a ACK flag, a PSH (Push) flag, a FIN (Finish) flag, HTTP (Hyper-Text Transfer Protocol) information, payload, and the like for each acquired packet.

The session ID is a session identifier (for example, a hash value) in the TCP level, generated based on four parameters, namely, the source IP address, the destination IP address, the source port number, and the destination port number. In other words, the recording part 12 generates the session ID by performing a predetermined operation (or computation) on input information of the acquired packet, namely, the source IP address, the destination IP address, the source port number, and the destination port number. The session ID that is obtained by performing the predetermined operation becomes the same when the values of the four parameters match. The predetermined operation does not distinguish the source IP address from the destination IP address, and does not distinguish the source port number from the destination port number. Hence, when the port number is the same for the packets that are exchanged between the client apparatus 20 and the production server 30*a*, the session ID becomes the same regardless of whether the packet is an uplink packet or a downlink packet.

The time indicates the time (communication time) acquired in the step S102. FIG. 18 illustrates a relative time from the time when the first packet of the working system is received. The source IP address indicates the IP address of the packet source (or sender). In this embodiment, the source IP address of the uplink packet indicates the IP address of the client apparatus 20. On the other hand, the source IP address of the downlink packet indicates the IP address of the production server 30*a*. The destination IP address indicates the IP address of the packet destination. In this embodiment, the destination IP address of the uplink packet indicates the IP address of the production server 30*a*. On the other hand, the destination IP address of the downlink packet indicates the IP address of the client apparatus 20. The source IP address and the destination IP address may be acquired from the IP header within the packet.

The source port number indicates the port number of the packet source. The destination port number indicates the port number of the packet destination. The sequence number indicates the sequence number of the packet. The ACK number indicates the ACK number of the packet. The SYN flag, the ACK flag, the PSH flag, and the FIN flag are included in a TCP header. The packet having the ACK flag that is "1" is the ACK packet. These various kinds of flags, the source port number, and the destination number may be acquired from the TCP header.

The HTTP information indicates a message content of the HTTP. FIG. 18 illustrates an example in which a request method (GET, etc.) or a response code (200, OK, etc.) is stored. The HTTP information may be acquired from a HTTP header. In this embodiment, the production server 30*a* provides services by HTTP, and for this reason, the HTTP information is stored. When other communication protocols, such as POP (Post Office Protocol) 3, an IMAP (Internet Message Access Protocol), and the like are used, information dependent on the communication protocol may be stored in place of the HTTP information.

The payload corresponds to data excluding headers of all of the layers of the packet. In this embodiment, it may not be necessary to store the payload.

Information related to the Ethernet (registered trademark) frame may be stored in the working system communication log storage 15. In addition, a source MAC (Media Access Control) address and a destination MAC address, for example, may be stored in the working system communication log storage 15.

On the other hand, in a case in which the source IP address or the destination IP address of the acquired packet does not match the IP address of the production server 30*a* and the judgement result in the step S102 is No, the recording part 12 judges whether the source IP address or the destination IP address of the acquired packet matches the IP address of the test server 30*b*, in a step S106. In other words, the recording part 12 judges whether the acquired packet is related to the communication in the inspecting system.

When the source IP address or the destination IP address of the acquired packet matches the IP address of the test server 30*b* and the judgement result in the step S106 is Yes, the recording part 12 acquires the present time from the timer (or clock) of the testing apparatus 10, in a step S107. Then, in a step S108, the recording part 12 analyzes the header of each layer within the packet and the payload of the packet. Further, in a step S109, the recording part 12 stores the present time and the analysis result of packet in the inspecting system communication log storage 17.

Accordingly, the steps S103 through S105 are performed every time a packet related to the inspecting system is acquired. As a result, the communication log of the inspecting system is accumulated in the inspecting system communication log storage 17. The inspecting system communication log storage 17 may have a structure similar to the structure of the working system communication log storage 15, and illustration and description thereof will be omitted.

Figure 19:
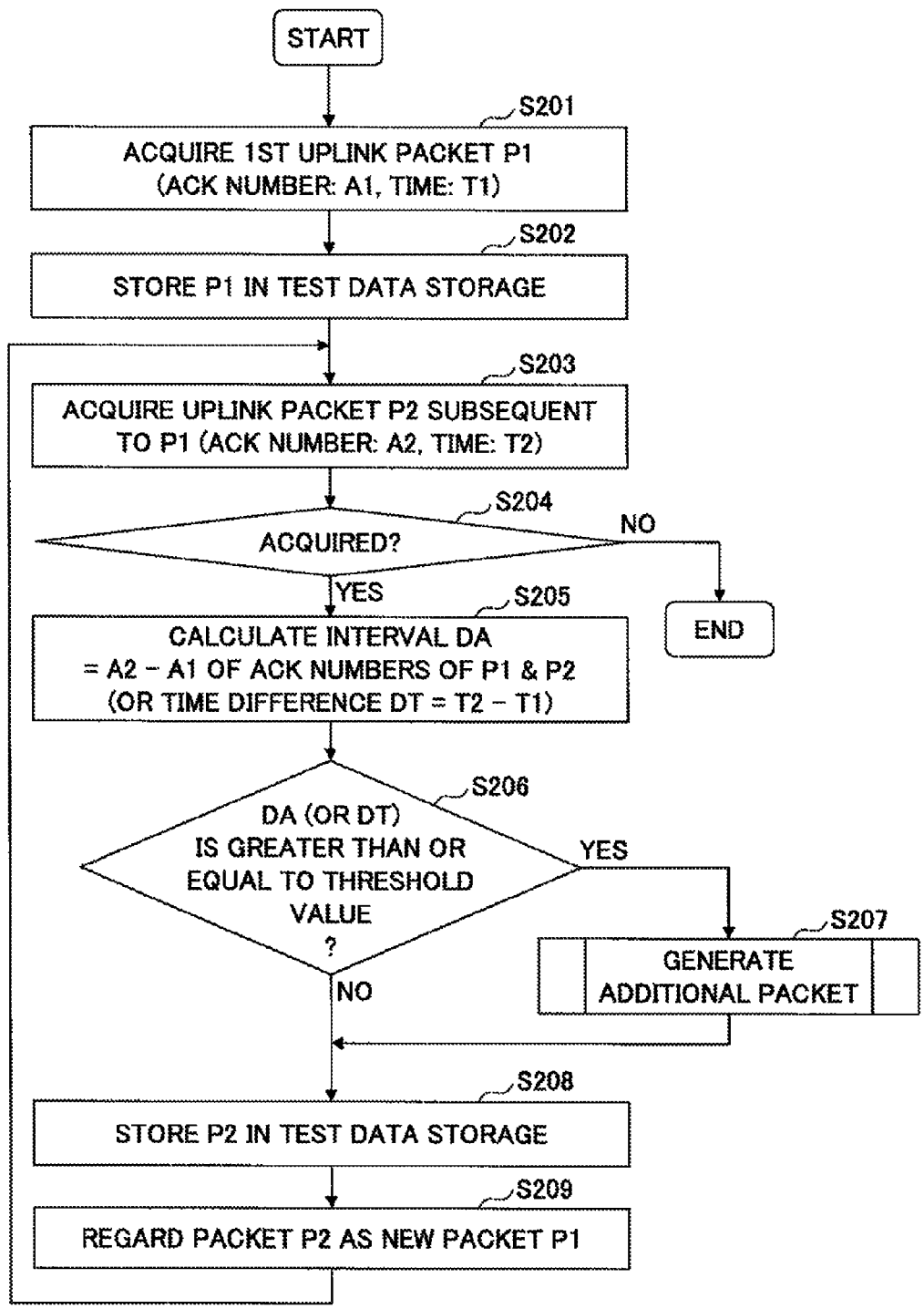
FIG. 19 is a flow chart for explaining an example of a processing sequence of a test data generating process of the testing apparatus.

Next, a description will be given of a test data generating process, by referring to FIG. 19. FIG. 19 is a flow chart for explaining an example of a processing sequence of the test data generating process of the testing apparatus.

In a step S201 illustrated in FIG. 19, the test data generating part 131 scans the records of the working system communication log storage 15 in the recorded order, and acquires the record related to the first uplink packet. This first uplink packet will be referred to as the "packet P1" for the sake of convenience. In addition, it is assumed for the sake of convenience that the ACK number of the packet P1 is A1, and the time of the packet P1 is T1. The judgement to determine whether each packet is an uplink packet may be made based on whether the source IP address matches the IP address of the production server 30a.

Next, in a step S202, the test data generating part 131 stores the acquired record in the test data storage 16. In other words, the record related to the packet P1 is copied to the test data storage 16.

Then, the test data generating part 131 scans the records in the working system communication log storage 15, following the record related to the packet P1, and acquires the record of the next uplink packet in a step S203. This next uplink packet will be referred to as the "packet P2" for the sake of convenience.

When the record of the packet P2 is acquired and the judgement result in the step S204 is Yes, the test data generating part 131 calculates the interval (or difference) DA between the ACK number of the packet P1 and the ACK number of the packet P2, in a step S205. Then, in a step S206, the test data generating part 131 judges whether the interval DA is greater than or equal to the threshold value with respect to the interval of the ACK numbers.

The threshold value with respect to the interval of the ACK numbers may be determined by placing emphasis on preventing the test server 30b from not sending the packet rather than taking into consideration the load with respect to the test server 30b. This is because the processing load of the additional packet on the test server 30b is negligibly small. For example, immediately after the start of the communication using the TCP/IP, the client may return one ACK packet every time two packets are received from the server. From the above described behavior, it may be regarded that the congestion window size will not be used up when the client returns one packet with respect to the receipt of two packets. Hence, in a case in which the client does not return the ACK packet after receiving four packets, it may be regarded that the congestion window size begins to decrease, and the threshold value may be determined in order not to generate such a situation. The threshold value may desirably be 4MSS. Of course, 4MSS is a theoretical value, and the reversal phenomenon of the sequence number and the ACK number does not necessarily occur even when the threshold value exceeds 4MSS. That is, the threshold value may actually be greater than 4MSS.

When the interval DA is greater than or equal to the threshold value and the judgement result in the step S206 is Yes, the test data generating part 131 performs an additional packet generating process, in a step S207. The details of the additional packet generating process will be described later in the specification. When the additional packet generating process is performed, the packet P1 corresponds to the preceding packet, and the packet P2 corresponds to the subsequent packet.

On the other hand, when the judgement result in the step S206 is No or, after the step S207, the test data generating part 131 stores the record related to the packet P2 in the test data storage 16, in a step S208. Then, the test data generating part 131 regards the packet P2 as the new packet P1 in a step S209, and the process returns to the step S203.

When the uplink packet cannot be acquired in the step S203 and the judgement result in the step S204 is No, that is, when the process related to all of the uplink packets ends, the process illustrated in FIG. 19 ends.

In the step S205, the test data generating part 131 may calculate a time interval (or difference) DT between the time of the packet P1 and the time of the packet P2. In this case, the test data generating part 131 judges whether the time interval DT is greater than or equal to a threshold value with respect to the time interval, in the step S206. When the time interval DT is greater than or equal to the threshold value and the judgement result in the step S206 is Yes, the test data generating part 131 performs the additional packet generating process in the step S207.

The threshold value that is used to judge whether the additional packet is to be added, may be obtained from an average, variance, time-series analysis, and the like of the intervals of the ACK numbers or the time intervals.

Figure 20:
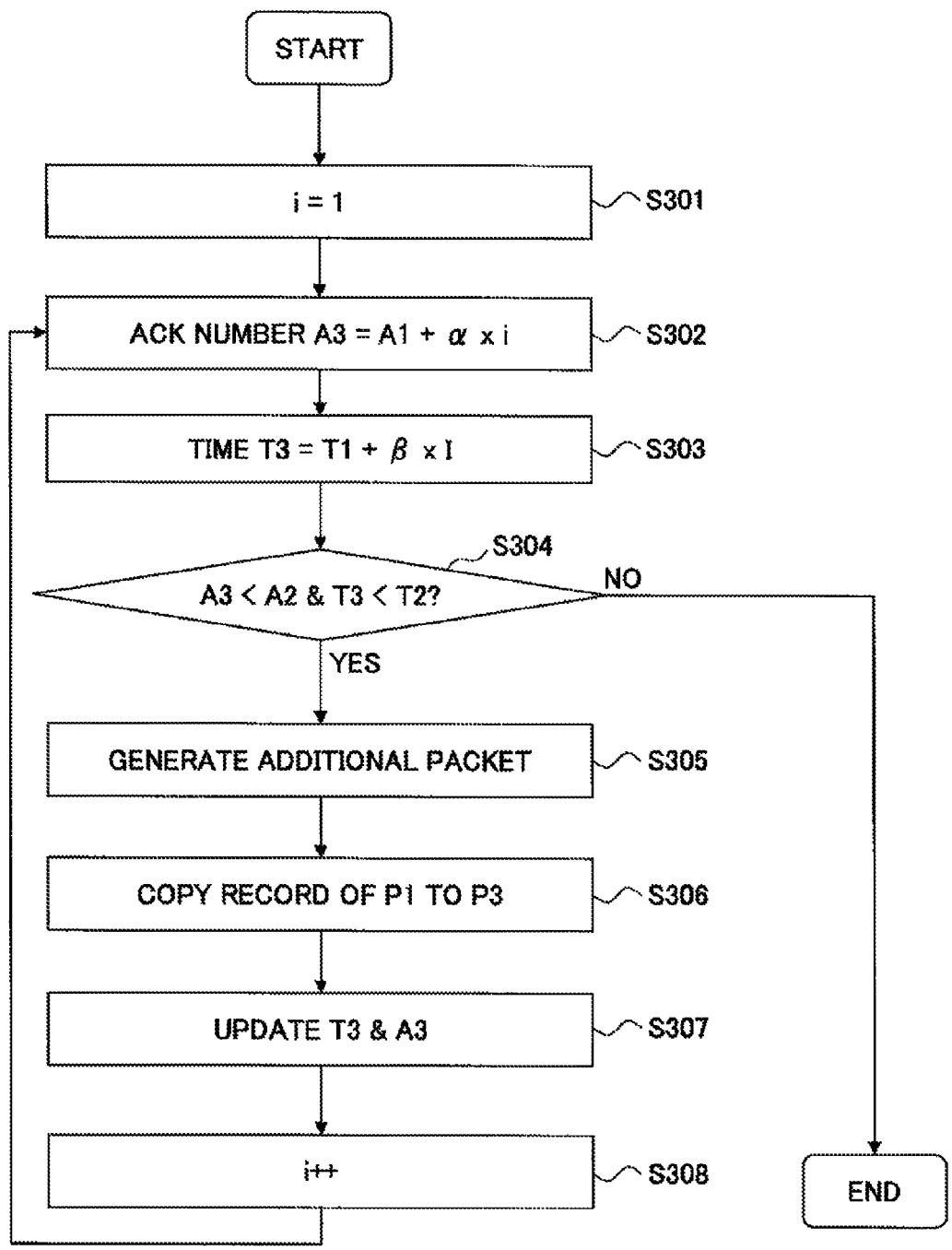
FIG. 20 is a flow chart for explaining an example of a processing sequence of an additional packet generating process.

Next, a more detailed description will be given of the step S207, by referring to FIG. 20. FIG. 20 is a flow chart for explaining an example of a processing sequence of the additional packet generating process.

In a step S301 illustrated in FIG. 20, the test data generating part 131 initializes a variable "i" to "1". The variable "i" stores the number of additional packets. Then, in a step S302, the test data generating part 131 calculates the ACK number of an additional packet P3. For example, the test data generating part 131 calculates the ACK number of the additional packet P3 based on the following formula, where α denotes an interval width of the ACK number between the additional packets.

(ACK Number of Packet P1)+α×i

The value of α may be set to "1", "1MSS" or "2MSS" as described above in conjunction with FIG. 11, FIG. 12 or FIG. 13, or may be set to other values. In addition, when generating two or more additional packets, the same ACK number may be used two consecutive times, as described above in conjunction with FIG. 10.

Next, in a step S303, the test data generating part 131 calculates the time of the additional packet. For example, the test data generating part 131 calculates the time of the additional packet based on the following formula, where β denotes the time interval between the additional packets.

(Time of Packet P1)+β×i

The value of β may be set to "RTT" as described above in conjunction with FIG. 14 or, may be set to other values.

Then, in a step S304, the test data generating part 131 judges whether a condition in which the ACK number of the additional packet is smaller than the ACK number of the packet P2 and the time of the additional packet is before the time of the packet P2. In other words, the step S304 judges whether A3<A2 and T3<T2. To be on the safe side, the condition used in the step S304 may be set so that the ACK number of the additional packet is less than or equal to a sum of the ACK number of the packet P1 and 2MSS, and so that the time of the additional packet is before the final tolerable send time described above in conjunction with FIG. 14. The above described condition, particularly the condition related to the ACK number, may differ depending on the implementation of the TCP.

When the condition is satisfied and the judgement result in the step S304 is Yes, the test data generating part 131 generates an empty (or blank) record for the additional packet in the test data storage 16, in a step S305. The empty record is generated next to the last record that is already stored in the test data storage 16. Hence, when the step S305 is performed for the first time with respect to the two target packets, the empty record is generated next to the record that is related to the packet P1 and is stored in step S202 illustrated in FIG. 19.

Next, in a step S306, the test data generating part 131 copies the contents of the record related to the packet P1 to the record of the additional packet generated in the step S305. Further, in a step S307, the test data generating part 131 updates the ACK number and the time in the record of the additional packet by the ACK number and the time calculated in the steps S302 and S303. Hence, the additional packet is substantially generated. Thereafter, in a step S308, the test data generating part 131 increments the variable "i" by "1", and the process returns to the step S302 in order to repeat the above described process.

When the condition is not satisfied and the judgement result in the step S304 is No, the process illustrated in FIG. 20 ends.

After the additional packet generating process, the record of the packet P2 is stored in the test data storage 16 in the step S208 illustrated in FIG. 19. Accordingly, the record related to the additional packet is stored in the test data storage 16 between the record of the preceding packet P1 and the record of the subsequent packet P2.

FIG. 20 described above illustrates the processing sequence in which a plurality of additional packets may be added. However, when only one additional packet is to be added, the step S302 and the subsequent steps need not be repeated.

By performing the processing sequences described above in conjunction with FIGS. 19 and 20, the records illustrated in FIG. 21, for example, are stored in the test data storage 16. FIG. 21 is a diagram illustrating an example of a structure of the test data storage.

As illustrated in FIG. 21, the records stored in the test data storage 16 are basically the records related to the uplink packets and extracted from the working system communication log storage 15. However, in the test data storage 16, the record related to the additional packet is added if necessary. FIG. 21 illustrates an example in which a record r3.8 and a record r4.2 related to the additional packets are added between a record r3.4 and a record r5.4. This is because the interval (or difference) between the ACK number of the record r3.4 and the ACK number of the record r5.4 is judged as being greater than or equal to the threshold value for this example. The codes used for the records in FIG. 21 conform to a naming rule "r<Time>".

In addition, the test data storage 16 includes an item (or column) called an additional packet flag. The additional packet flag may be used to identify the record related to the additional packet. In this embodiment, the additional packet flag is set to "1" for the record related to the additional packet. Hence, the additional packet flag is set to "1" for the record r3.8 and the record r4.2 of the additional packets.

When the number of additional packets added between the two target packets is one, the record r4.2 of this additional packet, for example, is not stored in the test data storage 16.

Figure 22:
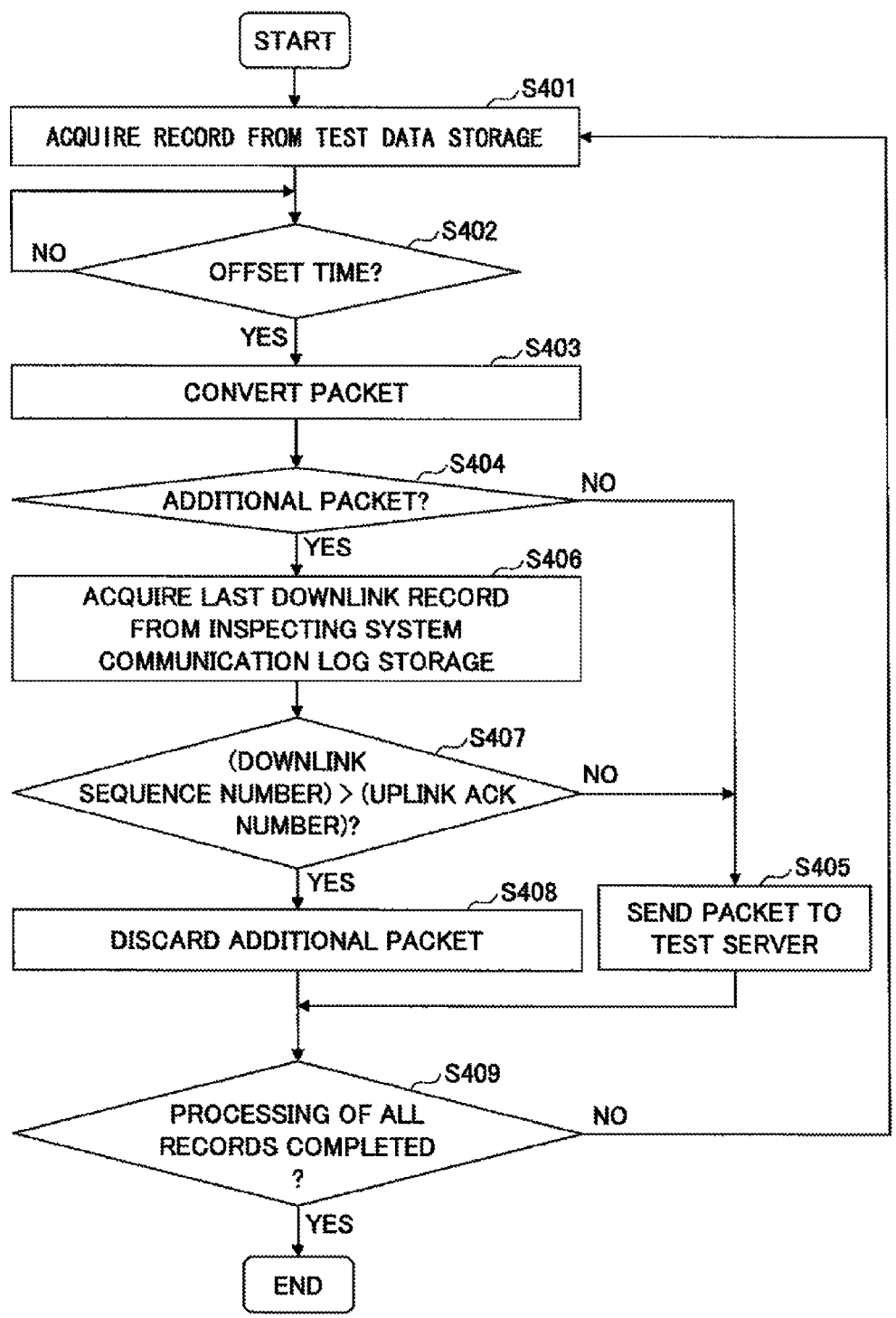
FIG. 22 is a flow chart for explaining an example of a processing sequence of a performance evaluation test of the testing apparatus.

Next, a description will be given of a processing sequence of a performance evaluation test, by referring to FIG. 22. FIG. 22 is a flow chart for explaining an example of the processing sequence of the performance evaluation test of the testing apparatus.

In a step S401 illustrated in FIG. 22, the converting part 132 acquires one record from the test data storage 16 that stores the records. The step S401 may acquire the record in the order in which the records are stored in the test data storage 16. The record acquired in the step S401 will hereinafter be referred to as a "target record".

Then, in a step S402, the converting part 132 assumes a standby state and waits for a time (hereinafter referred to as an "offset time") from the starting time of the test to the time of the target record. The starting time of the test is the time when the process illustrated in FIG. 22 is started.

When the offset time of the target record arrives, the converting part 132 converts the information recorded in the target record into information conforming to the inspecting system in order to generate a packet for the inspecting system, in a step S403. This generated packet for the inspecting system will be referred to as a "testing packet". More particularly, the step S403 converts the source IP address to the IP address of the testing apparatus 10. In addition, the converting part 132 converts the destination IP address of the target record to the IP address of the test server 30b. Accordingly, a check sum of the IP header, a check sum of the TCP header, and the like of the testing packet assume values different from those of the packet in the working system.

Moreover, the ACK number is also converted in the step S403. In the TCP/IP, an initial value of the sequence number is determined based on a random number when establishing the session according to a three-way handshake. Thereafter, the sequence number and the ACK number assume values that are obtained by adding a data length exchanged up to that point in time with respect to the initial value of the sequence number. Hence, the ACK number of each packet in the inspecting system does not necessarily match the ACK number of the corresponding packet in the working system. This is the reason why the conversion of the ACK number is also necessary.

In the inspecting system, the test that reproduces a communication sequence identical to the uplink communication sequence in the working system may anticipate the value of a future ACK number for the uplink packet in the inspecting system.

FIG. 23 is a diagram for explaining a conversion of the ACK number. In FIG. 23, a table illustrated in an upper portion indicates a part of the test data storage 16 before the conversion, and a table in a lower portion indicates a part of the test data storage 16 after the conversion. The stored contents in the test data storage 16 before the conversion are the stored results for the working system.

For example, it is assumed for the sake of convenience that the packet having the ACK number "5001" is sent 2.1 seconds after the start of the communication in the working system, and the packet having the ACK number "7001" is sent 2.3 seconds after the start of the communication. When the communication is started in the inspecting system and the packet having the ACK number "11001" is sent 2.1 seconds after the start of the communication, the amount of change in the ACK numbers between the inspecting system and the working system is 11001−5001=6000. Accordingly, the ACK number of the packet sent 2.4 seconds after the start of the communication in the inspecting system may be calculated to be "13001" by adding the amount of change "6000" to the value "7001" before the conversion.

In addition, because the source IP address, the destination IP address, and the like of the target record are converted, the converting part 132 may calculate the session ID based on the source IP address, the destination IP address, the source port number, and the destination port number of the target record after the conversion. The converting part 132 may update the session ID of the target record according to the calculated session ID. The converting part 132 may store correspondence information between the session ID before the update and the session ID after the update in the auxiliary storage unit 102. The session ID is not the data used for the communication but is the data used for the performance evaluation process. Thus, the performance evaluation process need only identify whether the sessions are the same. Of course, it may not be necessary to update the session ID.

When the source MAC address and the destination MAC address are the targets to be stored, a conversion similar to the conversion described above is also performed with respect to the source MAC address and the destination MAC address.

Information that needs to be converted and information that does not need to be converted are prestored in the auxiliary storage unit 102 with respect to the HTTP information, the payload, and the like. The converting part 132 converts the information that needs to be converted.

Next, in a step S404 illustrated in FIG. 22, the packet sending part 134 judges whether the testing packet is the additional packet, based on whether the additional packet flag related to the testing packet is set to "1".

When the testing packet is not the additional packet and the judgement result in the step S404 is No, the packet sending part 134 sends the test packet using the interface unit 105, in a step S405. In this embodiment, the destination IP address of the testing packet is the IP address of the test server 30b. Hence, the testing packet is transferred to the test server 30b. The packet acquiring part 11 performs the steps S107 through S109 illustrated in FIG. 17 in response to the sending of the testing packet. As a result, the record related to the testing packet is stored in the inspecting system communication log storage 17. In addition, the packet acquiring part 11 performs the steps S107 through S109 illustrated in FIG. 17 also with respect to the packet returned from the test server 30b in response to the testing packet.

On the other hand, when the testing packet is the additional packet and the judgement result in the step S404 is Yes, the packet deleting part 133 acquires the last downlink record related to the session ID identical to that of the testing packet, in a step S406. This record acquired by the step S406 is related to the packet (last downlink packet) that is sent last from the test server 30b.

Next, in a step S407, the packet deleting part 133 judges whether the sequence number of the record acquired by the step S406 is greater than the ACK number of the testing packet (additional packet). In other words, the step S407 judges whether the sequence number of the last downlink packet is greater than the ACK number of the additional packet. When the sequence number of the last downlink packet is greater than the ACK number of the additional packet and the judgement result in the step S407 is Yes, the packet deleting part 133 discards the additional packet in a step S408. In this case, no additional packet is sent. When the sequence number of the test server 30b is greater than the ACK number of the additional packet, the possibility that the ACK number of the reproduced uplink packet sent thereafter will exceed the sequence number of the test server 30b is low, even when no additional packet is sent. A typical case in which the additional packet is discarded occurs when the behavior of the test server 30b becomes identical to the behavior of the working system 30a.

It may be possible to suppress sending an unnecessary additional packet, by performing the step S408. The above described reproduced uplink packet sent thereafter corresponds to the uplink packet that is captured in the working system.

On the other hand, when the sequence number of the last downlink packet is less than or equal to the ACK number of the additional packet and the judgement result in the step S407 is No, the packet sending part 134 sends the additional packet in the step S405.

After the step S405 or the step S408, the converting part 132 judges whether the process illustrated in FIG. 22 is performed with respect to all records in the testing data storage 16, in a step S409. When a record that has yet to be processed remains in the test data storage 16 and the judgement result in the step S409 is No, the process returns to the step S401 in order to perform the process of the step S401 and the subsequent steps with respect to the remaining record. When the process is performed with respect to all records in the testing data storage 16 and the judgement result in the step S409 is Yes, the process illustrated in FIG. 22 ends.

When the process illustrated in FIG. 22 ends, the performance evaluating part 135 performs a performance evaluation with respect to the test server 30b.

FIG. 24 is a diagram for explaining a first performance evaluation method. According to the first performance evaluation method, it is a precondition that the difference between the RTT of the working system and the RTT of the inspecting system is known. For example, the tester may measure in advance the RTT of the working system and the RTT of the inspecting system, by utilizing a ping command and the like, and obtain a difference ($\Delta$RTT) between the two RTTs. FIG. 24 illustrates an example in which $\Delta$RTT=1.2 seconds. The RTT of the working system and the RTT of the inspecting system may differ because the communication distance in the working system and the communication distance in the inspecting system may not necessarily be the same.

In the working system illustrated in FIG. 24, it is assumed for the sake of convenience that the time (captured time) of the uplink packet Pa1 is 2.1 seconds after the start of the communication. It is also assumed for the sake of convenience that the time (captured time) of the packet Pc1 in response to the packet Pa1 is 2.3 seconds after the start of the communication. In this case, the value RTT1 of the RTT is 2.3−2.1=0.2 second.

On the other hand, in the inspecting system illustrated in FIG. 24, it is assumed for the sake of convenience that the time of the uplink packet Pb1, obtained by reproducing the packet Pa1, is 2.1 seconds after the start of the test, and that the time of the packet Pt1 in response to the packet Pa1 is 3.5 seconds after the start of the test. In this case, the value RTT2 of the RTT is 3.5−2.1=1.4 seconds.

The testing apparatus 10 compares RTT1 and (RTT2−$\Delta$RTT), and evaluates the performance of the test server 30b. The difference between the communication distance in the working system and the communication distance in the inspecting system may be absorbed by subtracting $\Delta$RTT from RTT2. In the example illustrated in FIG. 24, RTT1=0.2 second and (RTT2−$\Delta$RTT)=(1.4−1.2)=0.2 second are compared. Because RTT1 and (RTT2−$\Delta$RTT) are equal to each other in this example, it may be judged that the performance of the test server 30b is the same as (or comparable to) the performance of the production server 30a. It may be judged that the performance of the test server 30b is lower than that of the production server 30a when RTT1<(RTT2−$\Delta$RTT). On the other hand, it may be judged that the performance of the test server 30b is higher than that of the production server 30a when RTT1>(RTT2−$\Delta$RTT).

Next, a description will be given of the processing sequence of the testing apparatus 10 for realizing the first performance evaluation method illustrated in FIG. 24, by referring to FIG. 25. FIG. 25 is a flow chart for explaining an example of the processing sequence of the first performance evaluation process related to the test server. The process illustrated in FIG. 25 may be triggered by the end of the process illustrated in FIG. 22 or, the process illustrated in FIG. 25 may be performed at an arbitrary timing after the process illustrated in FIG. 22 is performed.

In a step S501 illustrated in FIG. 25, the performance evaluating part 135 acquires the difference $\Delta$RTT between the RTT of the working system and the RTT of the inspecting system from the auxiliary storage unit 102, for example. Then, in a step S502, the performance evaluating part 135 calculates the value RTT1 of the RTT until the HTTP response is received in response to the HTTP request in the working system, based on the record (communication log of the working system) stored in the working system communication log storage 15. For example, according to the working system communication log storage 15 illustrated in FIG. 18, the record recorded with "GET" in the HTTP information corresponds to the record of the packet related to the HTTP request. In addition, the record that has a session ID identical to that of this record recorded with "GET" in the HTTP information and is recorded with "200 OK" in the HTTP information corresponds to the record of the packet related to the HTTP response. The value RTT1 of the RTT may be calculated by subtracting the time of the record related to the HTTP request from the time of the record related to the HTTP response.

Next, in a step S503, the performance evaluating part 135 calculates the value RTT2 of the RTT until the HTTP response is received in response to the HTTP request in the inspecting system, based on the record (communication log of the inspecting system) stored in the inspecting system communication log storage 17. The HTTP request and the HTTP response used for the calculation of the value RTT2 may desirably be reproduced from the HTTP request and the HTTP response used for the calculation of the value RTT1. For example, the performance evaluating part 135 acquires from the inspecting system communication log storage 17 the record that has a session ID identical to or corresponding to the session ID of the record related to the HTTP request used for the calculation of the value RTT1 and has a time identical to that of the record related to the HTTP request used for the calculation of the value RTT1. The performance evaluating part 135 also acquires the record that has a session ID identical to that of the acquired record and is recorded with information (for example, the response code) indicating the HTTP response in the HTTP information. The performance evaluating part 135 calculates the difference between the times of the two acquired records, and this difference has the value RTT2.

Thereafter, in a step S504, the performance evaluating part 135 compares RTT1 and (RTT2−ΔRTT). When RTT1>(RTT2−ΔRTT) as a result of the comparison in the step S504, the performance evaluating part 135 judges in a step S505 that the performance of the test server 30b is higher than that of the production server 30a. When RTT1=(RTT2−ΔRTT) as a result of the comparison in the step S504, the performance evaluating part 135 judges in a step S506 that the performance of the test server 30b is the same as (or comparable to) that of the production server 30a. When RTT1<(RTT2−ΔRTT) as a result of the comparison in the step S504, the performance evaluating part 135 judges in a step S507 that the performance of the test server 30b is lower than that of the production server 30a. The test result output part 14 may output information indicating the judgement result of the steps S505, S506, and S507, by storing the information indicating the judgement result in the auxiliary storage unit 102 or, by displaying the information indicating the judgement result on the display unit, for example.

Next, a description will be given of a second performance evaluation method, by referring to FIG. 26. FIG. 26 is a diagram for explaining the second performance evaluation method. According to the second performance evaluation method, the performance of the test server 30b is evaluated by comparing the time interval of the downlink packets in the working system and the time interval of the downlink packets in the inspecting system. In a case in which the send interval of the uplink packets is the same for the working system and the inspecting system, the time interval of the downlink packets may be expected to be the same for the working system and the inspecting system, without being affected by the difference ΔRTT, when the performances of the production server 30a and the test server 30b are the same. Hence, the performance of the test server 30b may be evaluated by comparing the downlink time intervals of the working system and the inspecting system.

For example, in the working system illustrated in FIG. 26, it is assumed for the sake of convenience that the time (captured time) of the packet Pc1 is 2.1 seconds after the start of the communication, and the time (captured time) of the packet Pc2 is 2.4 seconds after the start of the communication. In this case, a time interval DT1 of the downlink packets in the working system becomes 2.4−2.1=0.3 second.

On the other hand, in the inspecting system illustrated in FIG. 26, it is assumed for the sake of convenience that the time of the packet Pt1 is 3.5 seconds after the start of the test, and the time of the packet Pt2 is 3.8 seconds after the start of the test. In this case, a time interval DT2 of the downlink packets in the inspecting system becomes 3.8−3.5=0.3 second.

In this example, the time interval DT1 of the downlink packets in the working system is equal to the time interval DT2 of the downlink packets in the inspecting system. For this reason, it may be judged that the performance of the test server 30b is the same as (or comparable to) the performance of the production server 30a. When DT1<DT2, it may be judged that the performance of the test server 30b is lower than that of the production server 30a. On the other hand, when DT1>DT2, it may be judged that the performance of the test server 30b is higher than that of the production server 30a.

Next, a description will be given of a processing sequence performed by the testing apparatus 10 for realizing the second performance evaluation method illustrated in FIG. 26, by referring to FIG. 27. FIG. 27 is a flow chart for explaining an example of the processing sequence of the second performance evaluation process related to the test server. The process illustrated in FIG. 27 may be triggered by the end of the process illustrated in FIG. 22 or, the process illustrated in FIG. 27 may be performed at an arbitrary timing after the process illustrated in FIG. 22 is performed.

In a step S601 illustrated in FIG. 27, the performance evaluating part 135 calculates the value DT1 of the time interval DT of the HTTP responses related to the same session ID in the working system, for example, based on the record (communication log of the working system) stored in the working system communication log storage 15. For example, the difference between the times of the two records that have the common session ID and in which the information (for example, response code) indicating the HTTP response is recorded in the HTTP information is calculated.

Next, in a step S602, the performance evaluating part 135 calculates the value DT2 of the time interval DT of the HTTP responses related to the same session ID in the inspecting system, for example, based on the record (communication log of the inspect system) stored in the inspecting system communication log storage 17. The HTTP responses used for the calculation of the value DT2 desirably corresponds to the HTTP responses used for the calculation of the value DT1. For example, the performance evaluating part 135 acquires from the inspecting system communication log storage 17 two records that have session IDs identical to or corresponding to the session IDs of the two records related to the two HTTP requests corresponding to the two HTTP responses used for the calculation of the value DT1 and have times identical to those of the two records related to the two HTTP requests corresponding to the two HTTP responses used for the calculation of the value DT1. The performance evaluating part 135 acquires the record that has a session ID identical to that of the acquired record and is recorded with information (for example, the response code) indicating the HTTP response in the HTTP information, for each of the two acquired records. The performance evaluating part 135 calculates the difference between the times of the two acquired records, and this difference has the value DT2.

Thereafter, in a step S603, the performance evaluating part 135 compares DT1 and DT2. When DT1>DT2 as a result of the comparison in the step S603, the performance evaluating part 135 judges in a step S604 that the performance of the test server 30b is higher than that of the production server 30a. When DT1=DT1 as a result of the comparison in the step S604, the performance evaluating part 135 judges in a step S605 that the performance of the test server 30b is the same as (or comparable to) that of the production server 30a. When DT1<DT2 as a result of the comparison in the step S603, the performance evaluating part 135 judges in a step S606 that the performance of the test server 30b is lower than that of the production server 30a. The test result output part 14 may output information indicating the judgement result of the steps S604, S5605, and S606, by storing the information indicating the judgement result in the auxiliary storage unit 102 or, by displaying the information indicating the judgement result on the display unit, for example.

The tester may judge whether the move of the production server 30a to the test server 30b is appropriate based on the judgement result of the performance evaluation process. For example, when the judgement result indicates that the performance of the test server 30b is higher than or equal to (or comparable to) the performance of the production server 30a, the tester may judge that the move to the test server 30b is appropriate or proper. On the other hand, when the judgement result indicates that the performance of the test server 30b is lower than that of the production server 30a, the tester may judge that the move to the test server 30b is inappropriate or improper.

As described above, according to the embodiment, the send interval of the packets to the test server 30b may be made the same as the send interval of the packets to the production server 30a. For this reason, the performance of the test server 30b may be evaluated in a state in which the processing load on the test server 30b is the same as (or comparable to) the processing load on the production server 30a.

In addition, by adding the additional packet, the possibility that the reversal phenomenon of the sequence number and the ACK number occurs may be reduced. Consequently, a situation in which the test server 30b stops sending the packets and the interruption of the performance evaluation test is inevitable may be avoided.

Even in a case in which the test server 30b is located at a remote location with respect to the working system, the performance evaluation test on the test server 30b may be performed with a high accuracy and a high efficiency.

Although the embodiments or examples are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A testing apparatus comprising:
   a first storage configured to store a communication log including a communication time and a response confirmation number of a plurality of packets;
   a processing circuit configured to generate an additional packet having a communication time and a response confirmation number between two consecutive packets having an interval greater than or equal to a threshold value in the communication log, wherein the interval is one of an interval of the communication times of the two consecutive packets and an interval of the response confirmation numbers of the two consecutive packets; and
   an interface unit to send each of the plurality of packets stored in the first storage and the additional packet to a destination at a time interval based on respective communication times thereof.

2. The testing apparatus as claimed in claim 1, further comprising:
   a recording part configured to store, in a second storage, a transmission log of sent packets that are sent from the interface unit and a reception log of received packets that are received in response to the packets sent from the interface unit,
   wherein the interface unit sends no additional packet when a response confirmation number of the additional packet is smaller than sequence numbers of the received packets stored in the second storage until the additional packet is sent.

3. The testing apparatus as claimed in claim 1, wherein the processing circuit generates a plurality of additional packets between two consecutive packets that are sent from the interface unit and have the interval greater than or equal to the threshold value.

4. A testing method to be implemented in a computer, the testing method comprising:
   generating, by a processing circuit of the computer, an additional packet having a communication time and a response confirmation number between two consecutive packets having an interval greater than or equal to a threshold value in a communication log that is stored in a first storage and includes a communication time and a response confirmation number of a plurality of packets, wherein the interval is one of an interval of the communication times of the two consecutive packets and an interval of the response confirmation numbers of the two consecutive packets; and
   sending each of the plurality of packets stored in the first storage and the additional packet to a destination at a time interval based on respective communication times thereof.

5. The testing method as claimed in claim 4, further comprising:
   storing in a second storage a transmission log of sent packets that are sent from by the sending and a reception log of received packets that are received in response to the packets sent by the sending,
   wherein the sending sends no additional packet when a response confirmation number of the additional packet is smaller than sequence numbers of the received packets stored in the second storage until the additional packet is sent.

6. The testing method as claimed in claim 4, wherein the generating generates a plurality of additional packets between two consecutive packets that are sent by the sending and have the interval greater than or equal to the threshold value.

7. A non-transitory computer-readable storage medium that stores a program which, when executed by a computer, causes the computer to perform a process comprising:

generating, by a processing circuit of the computer, an additional packet having a communication time and a response confirmation number between two consecutive packets having an interval greater than or equal to a threshold value in a communication log that is stored in a first storage and includes a communication time and a response confirmation number of a plurality of packets, wherein the interval is one of an interval of the communication times of the two consecutive packets and an interval of the response confirmation numbers of the two consecutive packets; and sending each of the plurality of packets stored in the first storage and the additional packet to a destination at a time interval based on respective communication times thereof.

8. The non-transitory computer-readable storage medium as claimed in claim 7, wherein the process further comprises:

storing in a second storage a transmission log of sent packets that are sent from by the sending and a reception log of received packets that are received in response to the packets sent by the sending, wherein the sending sends no additional packet when a response confirmation number of the additional packet is smaller than sequence numbers of the received packets stored in the second storage until the additional packet is sent.

9. The non-transitory computer-readable storage medium as claimed in claim 7, wherein the generating generates a plurality of additional packets between two consecutive packets that are sent by the sending and have the interval greater than or equal to the threshold value.

* * * * *